United States Patent
Kim et al.

(10) Patent No.: US 10,693,607 B2
(45) Date of Patent: *Jun. 23, 2020

(54) METHOD AND APPARATUS FOR ACTIVATING CARRIERS IN A MOBILE COMMUNICATION SYSTEM

(71) Applicant: Samsung Electronics Co., Ltd., Suwon-si, Gyeonggi-do (KR)

(72) Inventors: Soeng Hun Kim, Yongin-si (KR); Gert Jan Van Lieshout, Apeldoorn (NL); Jung Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

This patent is subject to a terminal disclaimer.

(21) Appl. No.: 15/250,238

(22) Filed: Aug. 29, 2016

(65) Prior Publication Data

US 2016/0365953 A1    Dec. 15, 2016

Related U.S. Application Data

(63) Continuation of application No. 13/637,245, filed as application No. PCT/KR2011/002067 on Mar. 25, 2011, now Pat. No. 9,432,156.

(30) Foreign Application Priority Data

Mar. 26, 2010  (KR) .................. 10-2010-0027293
May 12, 2010  (KR) .................. 10-2010-0044386
(Continued)

(51) Int. Cl.
*H04L 5/00*    (2006.01)

(52) U.S. Cl.
CPC .............. *H04L 5/003* (2013.01); *H04L 5/001* (2013.01); *H04L 5/0098* (2013.01)

(58) Field of Classification Search
CPC ....... H04L 5/001; H04L 5/003; H04L 5/0098; H04L 5/00053; H04L 5/0057;
(Continued)

(56) References Cited

U.S. PATENT DOCUMENTS

2006/0281465 A1    12/2006 McBeath et al.
2008/0165756 A1    7/2008 Ma
(Continued)

FOREIGN PATENT DOCUMENTS

CN    101189903 A    5/2008
CN    101547477 A    9/2009
(Continued)

OTHER PUBLICATIONS

ZTE: "Carrier activation for 4C-HSDPA", 3GPP Draft; R1-094760_4C-HSDPA-CARRIER_ACTIVATION, 3rd Generation Partnership Projeact (3GPP), Mobile Competence Centre; 650, Route Des Lucioles; F-06921 Sophia-Antipolis Cedex; France, No. Jeju; XP050389157, Nov. 9, 2009.
(Continued)

*Primary Examiner* — Erica Navar
(74) *Attorney, Agent, or Firm* — Jefferson IP Law, LLP

(57) ABSTRACT

The present invention relates to a method and apparatus for activating carriers in a mobile communication system, and includes determining, when an instruction message for aggregating multiple carriers is received, a bit position per carrier according to an identifier per carrier in the instruction message; checking, when a carrier state message including a state bitmap indicating state per carrier, the state per carrier according to the bit position per carrier in the state bitmap; and activating/deactivating the carriers according to the per-carrier states. According to the present invention, it is possible to minimize signaling overhead caused by carrier activation and deactivation.

16 Claims, 21 Drawing Sheets

(30) Foreign Application Priority Data

| Jun. 17, 2010 | (KR) | ........................ 10-2010-0057364 |
| Aug. 23, 2010 | (KR) | ........................ 10-2010-0081229 |
| Oct. 11, 2010 | (KR) | ........................ 10-2010-0098797 |

(58) Field of Classification Search
CPC ... H04L 5/0032; H04L 5/1469; H04L 5/0048; H04L 5/0078; H04L 5/0082; H04L 1/0026; H04L 5/0096; H04L 5/14; H04W 72/042; H04W 72/0453; H04W 72/00
USPC .................................................. 455/418–420
See application file for complete search history.

(56) References Cited

U.S. PATENT DOCUMENTS

| 2009/0219878 | A1 | 9/2009 | Oh et al. |
| 2010/0061284 | A1 | 3/2010 | Chen et al. |
| 2010/0232373 | A1 | 9/2010 | Nory et al. |
| 2010/0323740 | A1 | 12/2010 | Hunt et al. |
| 2011/0105107 | A1* | 5/2011 | Kwon .................. H04W 28/06 455/422.1 |
| 2011/0134774 | A1 | 6/2011 | Pelletier et al. |
| 2011/0243066 | A1 | 10/2011 | Nayeb Nazar et al. |
| 2012/0250559 | A1 | 10/2012 | Wu et al. |
| 2013/0039202 | A1 | 2/2013 | Feuersanger et al. |

FOREIGN PATENT DOCUMENTS

| JP | 2013-509791 A | 3/2013 |
| JP | 2013-520053 A | 5/2013 |
| WO | 2009-098615 A1 | 8/2009 |
| WO | 2009-108009 A1 | 9/2009 |
| WO | 2010/025681 A1 | 3/2010 |
| WO | 2011-053055 A2 | 5/2011 |

OTHER PUBLICATIONS

Samsung; L1 vs L2 CC Activation Command [online]; 3GPP TSG-RAN2#69 meeting; R2-101508; Feb. 22-26, 2010; San Francisco.

ETSI MCC; Report of 3GPP TSG RAN WG2 meeting #69; TSG-RAN Working Group 2 meeting #69; R2-101951; Apr. 12-16, 2010; Beijing, CN.

Huawei; Cell Index Usage in CA; 3GPP TSG-RAN WG2 Meeting #70bis; R2-103958; Jun. 28-Jul. 2, 2010; Stockholm, Sweden.

Huawei, CATT; The Details of Scell (De)activiation MAC CE; 3GPP TSG-RAN WG2 Meeting #70bis; R2-103989; Jun. 28-Jul. 2, 2010; Stockholm, Sweden.

R2-095808, 'Activation and Deactivation of Component Carrier' 3GPP TSG RAN WG2 Meeting #67bis, Oct. 12-16, 2009.

R2-101119 , 'DL Carrier Activation/Deactivation by MAC' 3GPP TSG RAN WG2 Meeting #69, Feb. 22-26, 2010.

R2-100148, 'Explicit Carrier Activation/Deactivation' 3GPP TSG RAN WG2 Meeting #68bis, Jan. 18-22, 2010.

R2-101082, 'Open Issues on Component Carrier Activation and Deactivation' 3GPP TSG RAN WG2 Meeting #69, Feb. 22-26, 2010.

R2-095874, "The need for additional activation procedure in carrier aggregation, "3GPP TSG-RAN2 #67bis Meeting, Oct. 12-16, 2009.

* cited by examiner

METHOD AND APPARATUS FOR ACTIVATING CARRIERS IN A MOBILE COMMUNICATION SYSTEM

This application is a continuation application of prior application Ser. No. 13/637,245, filed on Sep. 25, 2012, which has issued as U.S. Pat. No. 9,432,156 on Aug. 30, 2016, which is a National Stage Application under 35 U.S.C. § 371 of an International Application filed on Mar. 25, 2011 and assigned Application No. PCT/KR2011/002067, which claims the benefit under 35 U.S.C. § 119(a) of a Korean patent application filed on Mar. 26, 2010 in the Korean Intellectual Property Office and assigned Serial number 10-2010-0027293, and of a Korean patent application filed on May 12, 2010 in the Korean Intellectual Property Office and assigned Serial number 10-2010-0044386, and of a Korean patent application filed on Jun. 17, 2010 in the Korean Intellectual Property Office and assigned Serial number 10-2010-0057364, and of a Korean patent application filed on Aug. 23, 2010 in the Korean Intellectual Property Office and assigned Serial number 10-2010-0081229, and of a Korean patent application filed on Oct. 11, 2010 in the Korean Intellectual Property Office and assigned Serial number 10-2010-0098797, the entire disclosure of which is hereby incorporated by reference.

BACKGROUND OF THE INVENTION

Field of the Invention

The present invention relates to a method and apparatus of activating carriers for the terminal supporting uplink and downlink carrier aggregation in a mobile communication system.

Description of the Related Art

Mobile communication systems have developed to provide the subscribers with voice communication services on the move. With the advance of technologies, the mobile communications have been evolved to support high speed data communication services as well as the standard voice communication services. Recently, as one of the next generation mobile communication system, Long Term Evolution (LTE) is on the standardization by the 3rd Generation Partnership Project (3GPP). LTE is a technology designed to provide high speed packet-based communication of up to 100 Mbps and standardized almost completely now with the aim at commercial deployment around 2010 timeframe. As the LTE standard is on the verge of ratification, discussion is focused on LTE-advanced (LTE-A) with the adoption of various novel techniques to LTE.

One of these novel techniques is Carrier Aggregation. The Carrier Aggregation is a technique for a terminal to transmit/receive data using multiple carriers. In more detail, the terminal transmits and receives data through predetermined cells of aggregated carriers, typically the cells belonging to the same base station, and this has the same meaning that the terminal communicates data through multiple cells.

DISCLOSURE OF INVENTION

Technical Problem

In the aforementioned mobile communication system, the carrier aggregation is performed in such a way that the information on the carriers to be aggregated is sent to the UE (this is referred to as carrier configuration) and then the configured carriers are activated at an appropriate time point afterward. The reason why the procedure is divided into carrier configuration and carrier activation is to minimize the battery consumption of the UE by turning on only the transceiver corresponding to the activated carrier rather than the transceivers corresponding to all of the configured carriers. Accordingly, it is preferred to perform the carrier activation process as soon as possible. Also, it is preferred to minimize the signaling overhead caused by the control information so as to be able to activate and deactivate the carriers frequently.

Solution to Problem

In order to solve the above problem, a carrier activation method of a receiver in a mobile communication system includes determining, when an instruction message for aggregating multiple carriers is received, a bit position per carrier according to an identifier per carrier in the instruction message; checking, when a carrier state message including a state bitmap indicating state per carrier, the state per carrier according to the bit position per carrier in the state bitmap; and activating/deactivating the carriers according to the per-carrier states.

Also, in order to solve the above problem, a carrier activation method of a transmitter in a mobile communication system includes transmitting an instruction message indicating identifiers of multiple carriers to be aggregated; transmitting a carrier state message including a state bitmap for indicating state per carrier at a bit position corresponding to the identifier per carrier; and activating/deactivating the carriers according to the per-carrier states.

Also, in order to solve the above problem, a carrier activation apparatus of a receiver in a mobile communication system includes a transceiver for receiving an instruction message for aggregation multiple carriers and a carrier state message including a state bitmap indicating state per carrier; a control message processor for determining, when the instruction message is received, a bit position per carrier according to an identifier per carrier in the instruction message; and a carrier activation controller for aggregating, when the instruction message is received, the carriers and checking, when the state message is received, state per carrier and activating or deactivating each carrier according to the per-carrier state.

Still, in order to solve the above problem, a carrier activation apparatus of a transmitter in a mobile communication system includes a transceiver for transmitting an instruction message indicating identifiers of multiple carriers to be aggregated and a carrier state message including a state bitmap for indicating state per carrier at a bit position corresponding to the identifier per carrier; and a controller for controlling transmission of the instruction message and the carrier state message and activating or deactivating the carriers according to the per-carrier states.

Advantageous Effects

With the application of the present invention, it is possible to minimize the signaling overhead caused by carrier activation and deactivation and SRS activation and deactivation.

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The present invention relates to a carrier activation method and apparatus of a terminal capable of carrier aggregation. The present invention also relates to a method and apparatus for controlling transmission of uplink channel estimation signal (Sounding Reference Signal, SRS).

Figure 1:
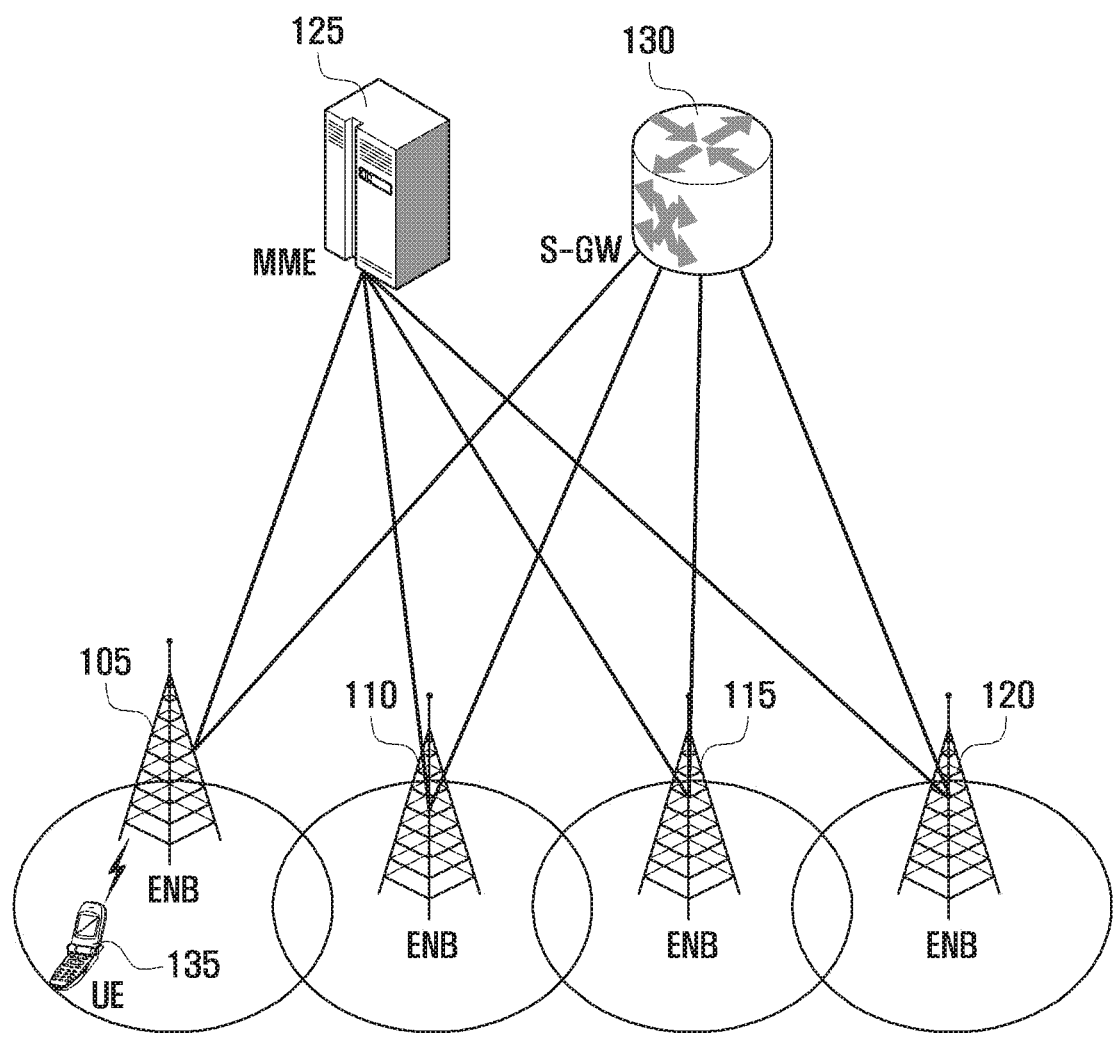
FIG. 1 is a diagram illustrating the architecture of an LTE system to which the present invention is applied.
Figure 2:
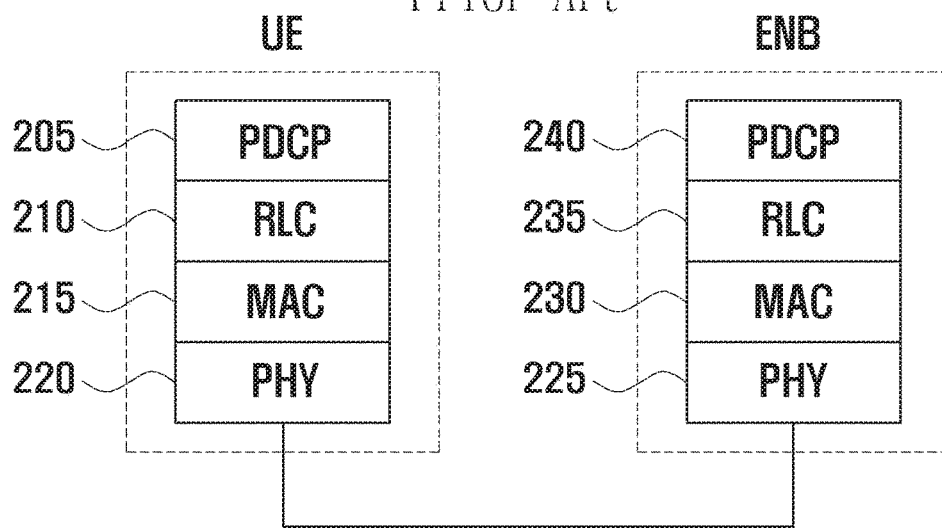
FIG. 2 is a diagram illustrating a protocol stack of the LTE system to which the present invention is applied.
Figure 3:
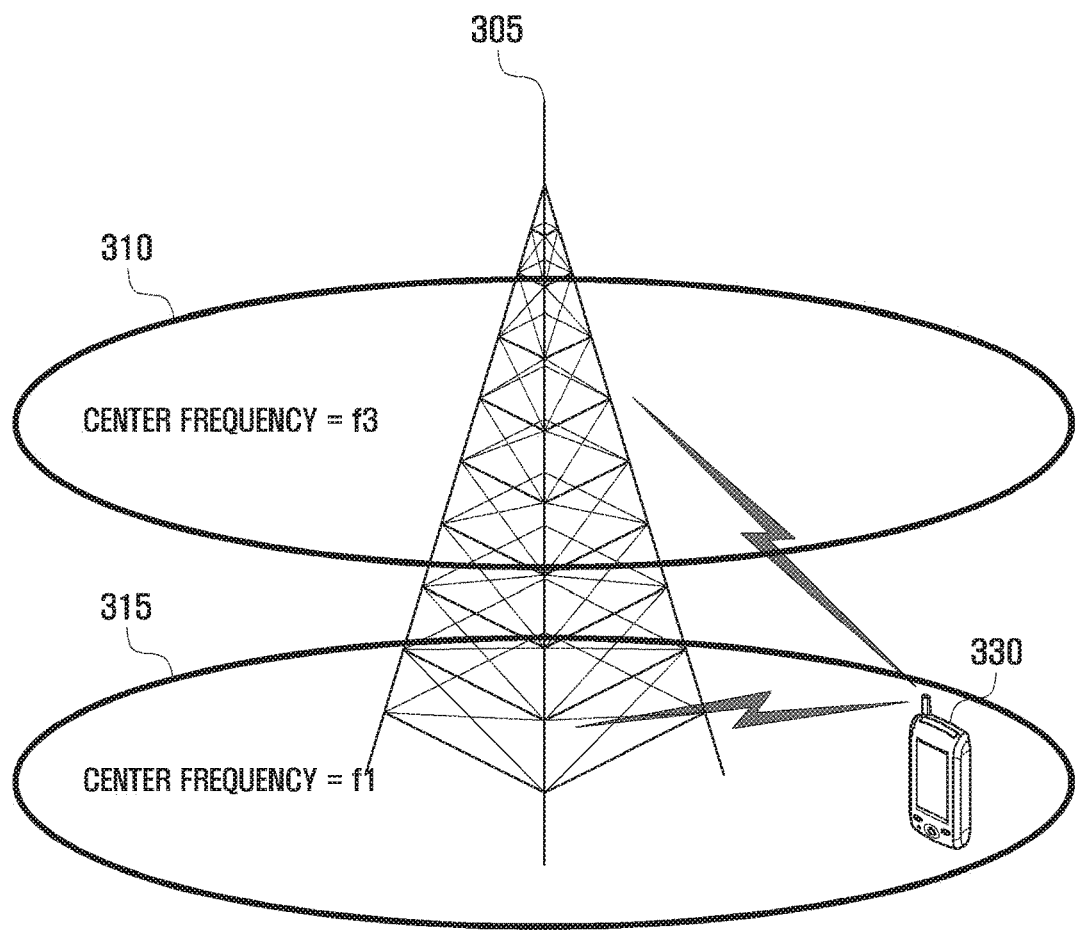
FIG. 3 is a diagram illustrating carrier aggregation in a normal eNB.

Prior to explaining the present invention, a description is made of the LTE mobile communication system in more detail with reference to FIGS. 1, 2, and 3.

FIG. 1 is a diagram illustrating the architecture of an LTE system to which the present invention is applied.

Referring to FIG. 1, the radio access network of the mobile communication system includes evolved Node Bs (eNBs) 105, 110, 115, and 120, a Mobility Management Entity (MME) 125, and a Serving-Gateway (S-GW) 130. The User Equipment (hereinafter, referred to as UE) 135 connects to an external network via eNBs 105, 110, 115, and 120 and the S-GW 130.

The eNBs 105, 110, 115, and 120 correspond to legacy node Bs of Universal Mobile Communications System (UMTS). The eNBs 105, 110, 115, and 120 allow the UE to establish a radio link and are responsible for complicated functions as compared to the legacy node B. In the LTE system, all the user traffic including real time services such as Voice over Internet Protocol (VoIP) are provided through a shared channel and thus there is a need of a device which is located in the eNB to schedule data based on the state information such as UE buffer conditions, power headroom state, and channel state. Typically, one eNB controls a plurality of cells. In order to secure the data rate of up to 100 Mbps, the LTE system adopts Orthogonal Frequency Division Multiplexing (OFDM) as a radio access technology. Also, the LTE system adopts Adaptive Modulation and Coding (AMC) to determine the modulation scheme and channel coding rate in adaptation to the channel condition of the UE. The S-GW 130 is an entity to provide data bearers so as to establish and release data bearers under the control of the MME 125. MME 125 is responsible for various control functions and connected to a plurality of eNBs 105, 110, 115, and 120.

FIG. 2 is a diagram illustrating a protocol stack of the LTE system to which the present invention is applied.

Referring to FIG. 2, the protocol stack of the LTE system includes Packet Data Convergence Protocol (PDCP) 205 and 240, Radio Link Control (RLC) 210 and 235, Medium Access Control (MAC) 215 and 230, and Physical (PHY) 220 and 225. The PDCP 205 and 240 is responsible for IP header compression/decompression, and the RLC 210 and 235 is responsible for segmenting the PDCP Protocol Data Unit (PDU) into segments in appropriate size for Automatic Repeat Request (ARQ) operation. ARQ is the technique for checking whether the packet transmitted by the transmitted is received by the received successfully and retransmitting the packets received erroneously. The MAC 215 and 230 is responsible for establishing connection to a plurality of RLC entities so as to multiplex the RLC PDUs into MAC PDUs and demultiplex the MAC PDUs into RLC PDUs. The PHY 220 and 225 performs channel coding on the MAC PDU and modulates the MAC PDU into OFDM symbols to transmit over radio channel or performs demodulating and channel-decoding on the received OFDM symbols and delivers the decoded data to the higher layer. With the reference to transmission, the data input to the protocol entity is referred to as SDU (Service Data Unit), and the data output by the protocol entity is referred to as PDU (Protocol Data Unit).

FIG. 3 is a diagram illustrating carrier aggregation in a normal eNB.

Referring to FIG. 3, an eNB performs transmission and reception on multiple carriers of different frequency bands in general. For example, the eNB 305 can be configured to use the carrier 315 with center frequency f1 and the carrier 310 with center frequency f3. If carrier aggregation is not supported, the UE 330 has to transmit/receive data unit one of the carriers 310 and 315. However, the UE 330 capable of carrier aggregation capability can transmit/receive data using both the carriers 310 and 315.

Accordingly, the eNB is capable of increasing the resource amount to be allocated to the UE capable of carrier aggregation in adaptation to the channel condition of the UE so as to improve the data rate of the UE. That is, assuming that a cell is configured with one downlink carrier for transmission of the eNB and one uplink carrier for reception of the eNB in the conventional concept, the carrier aggregation can be understood as if the UE transmits and receives data through multiple cells simultaneously. With the use of carrier aggregation, the maximum data rate increases in proportion to the number of aggregated carriers. In the following description, the phrase "the UE receives data through a certain downlink carrier or transmits data through a certain uplink carrier" means to transmit or receive data through control and data channels provided in a cell that correspond to center frequencies and frequency bands of the downlink and uplink carriers.

Figure 4:
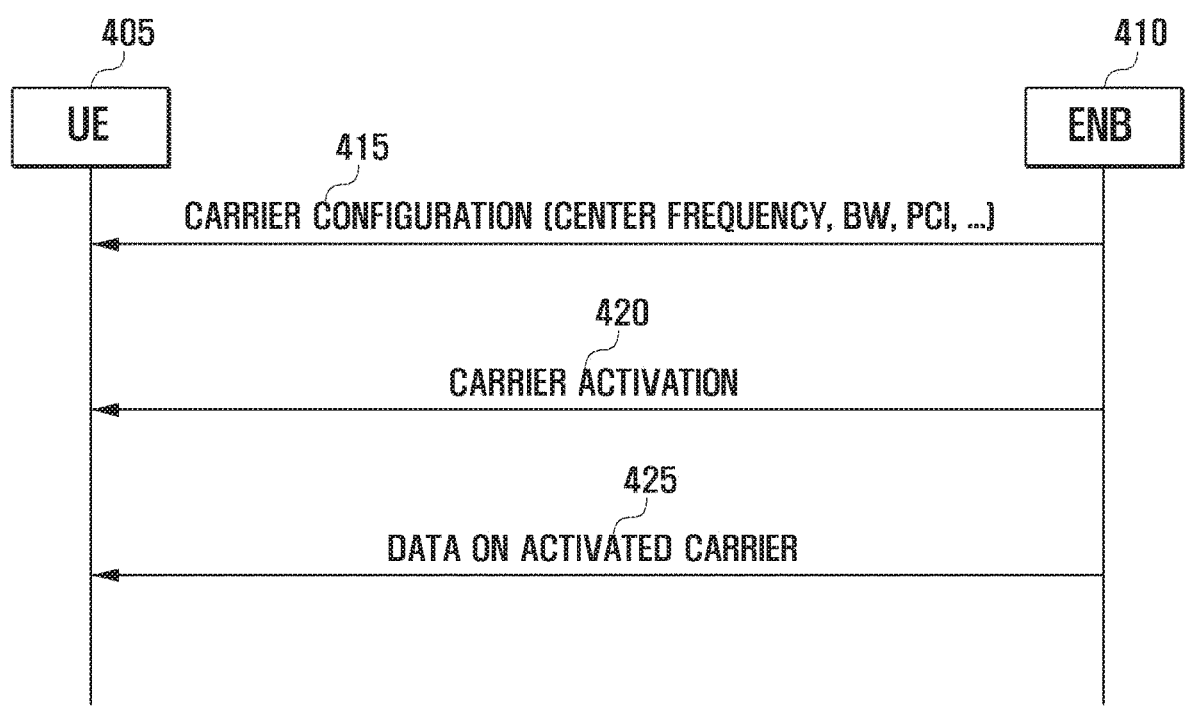
FIG. 4 is a signaling diagram illustrating a procedure of aggregating and activating a carrier in the LTE mobile communication system.

FIG. 4 is a signaling diagram illustrating a procedure of aggregating and activating a carrier in the LTE mobile communication system.

Referring to FIG. 4, the carrier aggregation can be divided into a step of sending the UE 405 the information on the carriers and a step of activating the carriers. For example, the eNB 410 provides a certain UE 405 capable of carrier aggregation with the information on the carriers to be aggregated at step 415. This information includes center frequency, bandwidth, and physical Cell ID (PCI) of carrier. The UE 405 memorizes the acquired information and, if necessary, performs an operation of establishing downlink synchronization of the corresponding cell on the corresponding carrier. If the downlink synchronization of a cell is established, this means that a synchronization channel of the corresponding cell is received so as to acquire frame synchronization. To establish downlink synchronization in a certain cell can be expressed that the cell is identified. Afterward, if the data amount to be transmitted from the eNB 410 to the UE 405 increases, the eNB 401 activates the carriers aggregated for the UE 405 at step 420. The eNB 410 transmits the data through activated carriers so as to increase the data rate at step 425.

In the following description, if a carrier is aggregated, this has the same meaning that specific cell corresponding to the carrier is aggregated. To transmit the information on the carrier and cell to be aggregated is also expressed as "to configure the corresponding carrier." Also, an aggregated carrier is referred to as Component Carrier (CC). In the following description, the terms 'carrier', 'cell', and CC are used interchangeably.

The first embodiment of the present invention proposes a method for activating or deactivating some or all of the downlink carriers aggregated to a UE according to the instruction of the eNB.

First Embodiment

In order to activate or deactivate a specific downlink carrier, the eNB sends the UE a control message including necessary information. The control message includes the information indicating whether the corresponding control message is the message for activating or deactivating and the information indicating which carrier is to be activated or deactivated. By taking notice that the number of downlink carriers to be aggregated for the UE is up to 5 and a carrier is in one of activated and deactivated states, the conventional method which discriminates between the activation control message and deactivation control message and signals the indicator of the carrier to be activated or deactivated has a few drawback to be described later.

The present invention proposes a method for activating or deactivating appropriate carriers between the eNB and UE by exchanging the control messages indicating the state of the downlink carriers in the form of a bitmap to activate or deactivate the downlink carriers more efficiently. In order to activate or deactivate carriers, the eNB sends the UE a bitmap indicating the preferred states of the carriers aggregated for the UE such that the UE compares the carrier state indicated in the bitmap with the current state of the carrier to determine whether to activate or deactivate the corresponding carrier or to determine whether to maintain the current state. In the present invention, the control message indicating the states of the downlink carriers is referred to as downlink carrier state control message.

Figure 5:
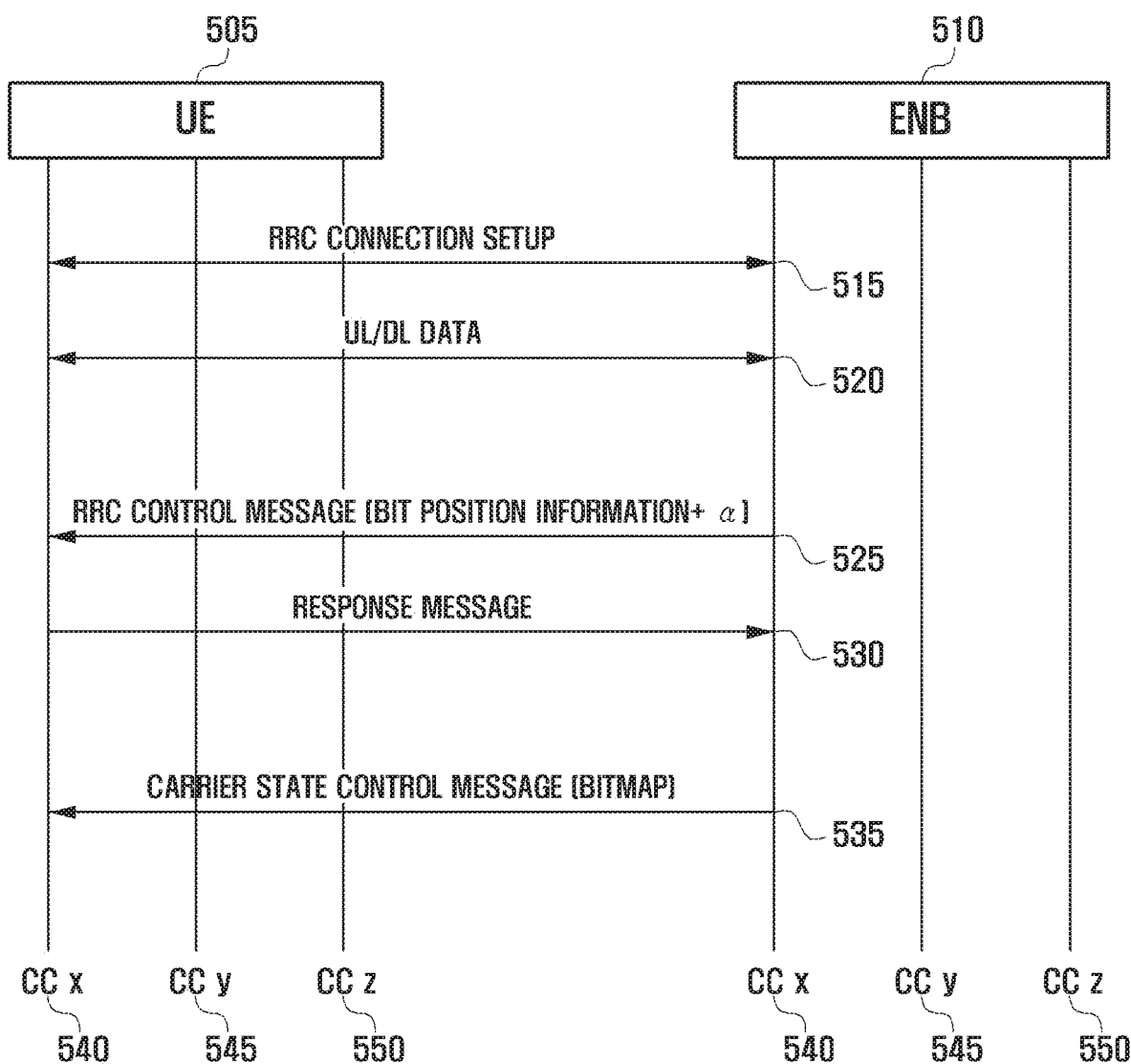
FIG. 5 is a signaling diagram illustrating entire operation in the first embodiment of the present invention.

FIG. 5 is a signaling diagram illustrating entire operation in the first embodiment of the present invention.

Referring to FIG. 5, the eNB 510 and the UE 505 starts communication using one carrier in general. For example, the UE 505 performs RRC connection configuration procedure with the eNB 510 at step 515 and performs downlink/uplink data communication through the carrier on which the RRC connection has been established at step 520. For example, assuming that the RRC connection has been established on the carrier x 540, the UE 505 and the eNB 510 perform downlink/uplink data communication on the carrier x 540. Afterward, if the required data amount of the UE 505 increases at a certain time point, the eNB 510 sends a predetermined RRC control message to the UE 505 in order to aggregate multiple carriers at step 525. For example, assuming that carrier y 545 and carrier z 550 are aggregated additionally, the eNB 510 transmits the RRC message including the information about the carriers to be aggregated, e.g. center frequency and bandwidth of the carriers.

In the present invention, the control message also includes the information indicating the bit numbers in the bitmap of the carrier state control message that correspond to the carriers to be aggregated. Here, the aforementioned information denotes bit positions of the corresponding carriers. The control message is also capable of including the carrier indicator for use in identifying the aggregated carriers. The bit position or carrier indicator has to be assigned to the carrier carrying the control message and thus being used, e.g. carrier x 540. However, since the carrier x 540 is being used already, it is inefficient to provide the information thereon in the control message for new carrier aggregation. Accordingly, in transmitting the carrier aggregation information to the UE through the control message at a certain time point, if no bit position or carrier indicator is assigned to the carry carrying the carrier aggregation information yet, it is proposed in the present invention to use a predetermined value for the corresponding carrier. For example, it is possible to configure the first bit of the bitmap for the carrier which has been aggregated already but not assigned a bit position or carrier indicator and assigns a carrier indicator of 0.

If the RRC control message is received, the UE 505 aggregates the carriers indicated by the eNB 510 and prepares for performing, if necessary, data communication immediately. The UE 505 also memorizes the bit positions and carrier identifiers of the aggregated carriers. The carrier identifiers can be used in cross-carrier scheduling afterward. Exemplifying the above described procedure, the eNB 510 has newly aggregated the carrier y 545 and carrier z 550 for the UE 505 with the designation of the carrier y 545 for the second bit position and carrier identifier of 1 and the carrier z 550 for the third bit position and carrier identifier of 2. These informations are included in the control message transmitted at step 525 for carrier aggregation. Since the carrier x 540, although aggregated already, has not been assigned a bit position and a carrier identifier, the UE 505 sets the bit position of the carrier x 540 to the first set and the carrier identifier to 0 according to a predetermined rule.

Next, the UE 505 sends the eNB 510 a response message in response to the RRC control message and thus the eNB 510 receives the response message at step 530. If it is determined to activate or deactivate a carrier at a certain time point, the eNB 510 sends the UE a downlink carrier state control message at step 535. For example, if it is intended to activate the carrier y 545 newly, the eNB 510 transmits the carrier state control message having the bitmap with the first and second bits set to 1 and the third bit set to 0. If the carrier state control message is received, the UE 505 changes the state of the downlink carrier of which current state differs from the indicated state to the indicated state. That is, since the current state of the carrier y 545 is the deactivated state and the indicated state is the activated state, the UE activates the carrier y 545.

Although the description is directed to the example where multiple carriers to be aggregated are assigned per-carrier bit positions and identifiers independently, the present invention is not limited thereto. That is, in order to minimize the signaling overhead, the per-carrier bit positions and carrier identifiers can be configured integrally. For example, in the case that two carriers are aggregated for the UE 505, the eNB 510 is capable of the carrier identifiers in such a way that the lowest carrier identifier, i.e. the carrier identifier 0, corresponds to the first bit and the second lowest carrier identifier, i.e. the carrier identifier 1, corresponds to the second bit. In this case, if a bit position or a carrier identifier is not allocated to the carrier carrying the carrier aggregation information, a value predetermined for the carrier identifier of the corresponding carrier, i.e. 0, can be used and then the bit position of the carrier can be determined as the first bit of the bitmap based on the implicitly determined carrier identifier. For reference, if no bit position has been assigned yet when the carrier aggregation-related control message carrying the bitmap is transmitted on a certain carrier, the carrier must be the primary carrier. If the carrier in use has not been assigned a bit position or carrier identifier, this means that the carrier has been used before the start of the carrier aggregation procedure. Since the UE 505 and the eNB 510 use the carrier which has been used at the initial RRC connection configuration, i.e. the carrier has been used before the start of the carrier aggregation procedure, as the primary carrier, the carrier which has been aggregated already but assigned the bit position and carrier identifier is identical with the primary carrier.

That is, although the primary carrier may change through a predetermined control procedure, the primary carrier at the start of the carrier aggregation procedure is the carrier carrying the carrier aggregation-related control message and assigned neither bit position on carrier identifier. Accordingly, the implicit bit position and the carrier identifier determination operation can be modified in such way that the bit position and carrier identifier of the primary carrier which has assigned neither bit position nor carrier identifier are set to predetermined values.

Figure 6:
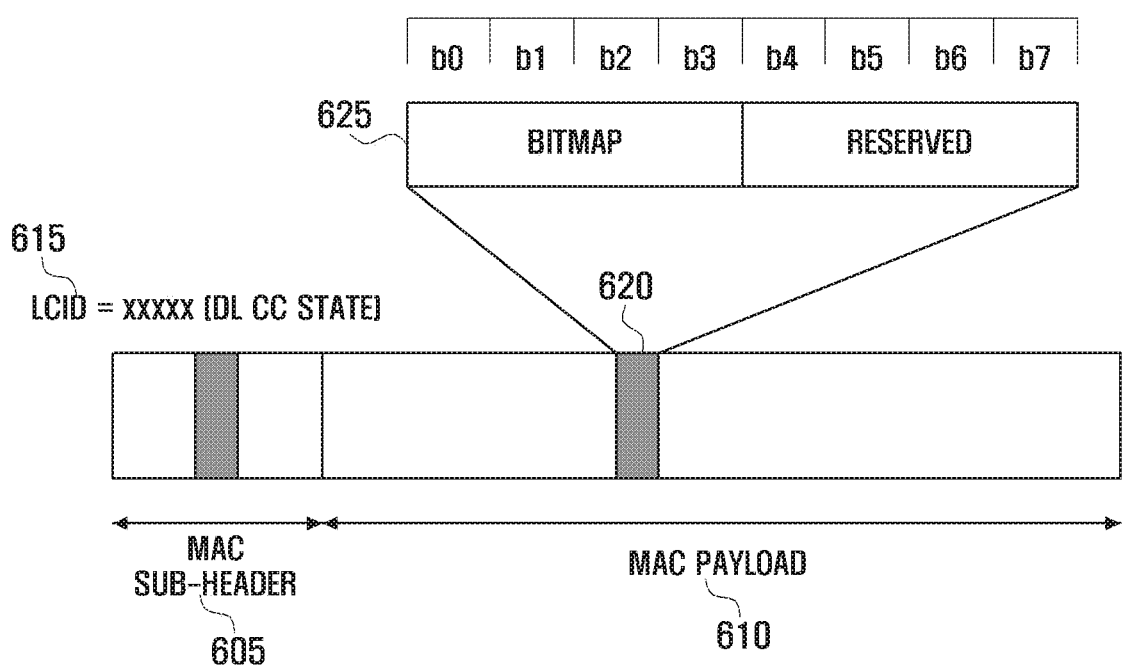
FIG. 6 is a diagram illustrating an example of the downlink carrier state control message.

FIG. 6 is a diagram illustrating an example of the downlink carrier state control message.

Referring to FIG. 6, the downlink carrier state control message can be a MAC layer control message. A MAC PDU consists of a MAC sub-header 605 and a MAC payload 610. The MAC sub-header 605 includes a logical channel identifier as the information on which type of data is carried. In the present invention, new logical channel identifier is used for the carrier state control message. This identifier is the logical channel identifier which is not used, e.g. 11011. If the carrier activation and deactivation commands are defined separately, this requires two logical channel identifiers; however, if the carrier state control message is used as for both the carrier activation and deactivation as proposed in the present invention, one logical channel identifier is enough. The format of MAC PDU is specified in section 6.1 of TS36.321 in detail.

In the present invention, if the MAC PDU contains the downlink carrier state control message, the eNB inserts in the MAC sub-header 650 the information indicating that the downlink carrier state control message is carried. This information is the logical channel identifier 615 defined for downlink carrier state control message.

Unlike the present invention, if different control messages are used for activating and deactivating a carrier and the identifier of the carrier to be activated or deactivated is indicated explicitly, the number of the control message transmissions increases in proportion to the number of carriers activated and deactivated, resulting in increase of signaling overhead.

Figure 7:
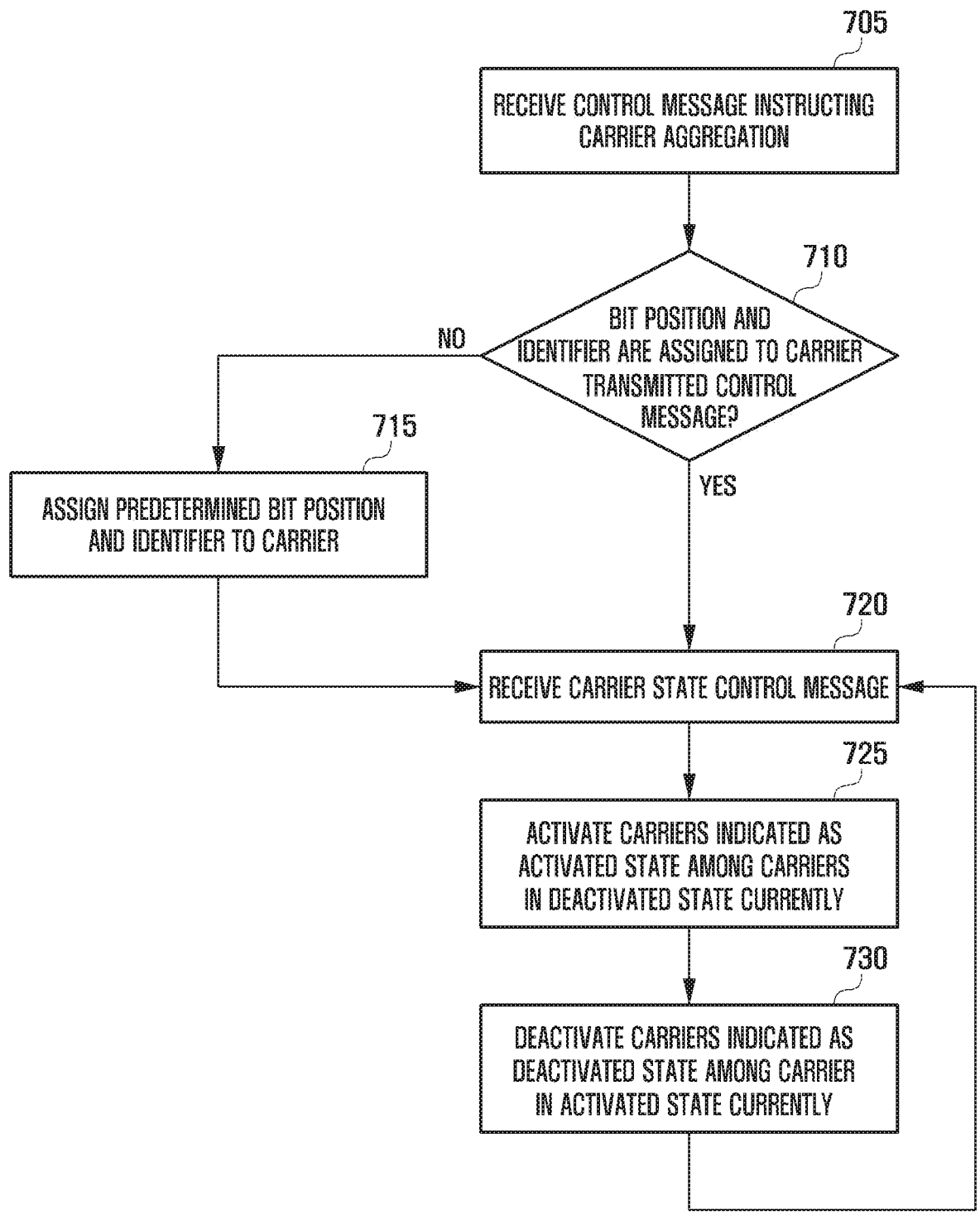
FIG. 7 is a flowchart illustrating the UE operation according to the first embodiment of the present invention.
Figure 8:
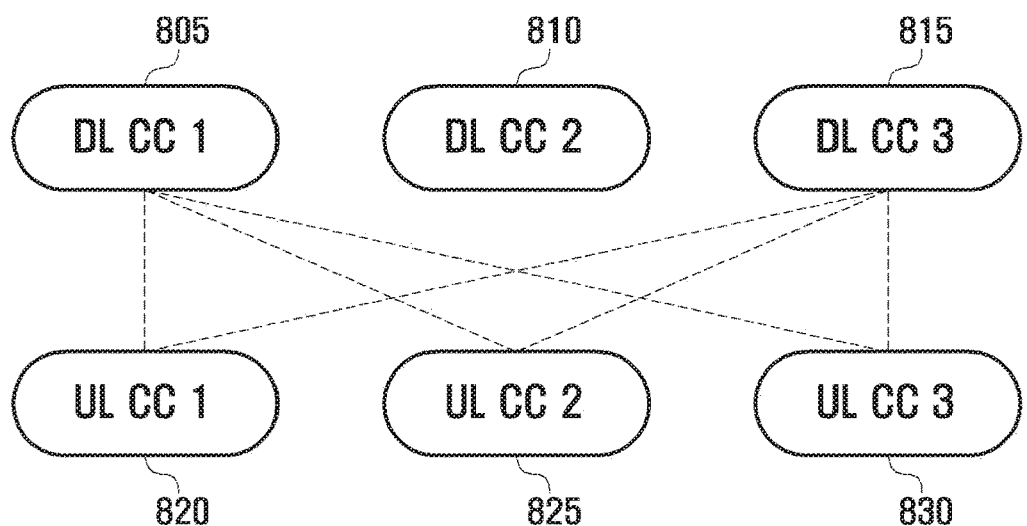
FIG. 8 is a diagram illustrating an example of relationship among multiple downlink carriers and multiple uplink carriers.

FIG. 7 is a flowchart illustrating the UE operation according to the first embodiment of the present invention.

Referring to FIG. 7, if the control message instructing carrier aggregation is received at step 705, the UE aggregates the carriers as instructed by the control message. The UE also checks the bit positions and carrier identifiers of the carriers. The UE determines whether the downlink carrier carrying the control message has been assigned the bit position and carrier identifier at step 710. If no bit position and no carrier identifier have been assigned at step 710, the UE sets the bit position and carrier identifiers of the downlink carrier to predetermined values at step 715. For example, the predetermined values may be the first bit of the bitmap and identifier 0.

Next, if it is determined at step 710 that the downlink carrier has assigned a bit position and a carrier identifier, the UE configures the downlink carrier with the bit position and carrier identifier at step 715 and, if the downlink carrier state control message is received at step 720, determines the downlink carrier to be activated at step 725. At this time, the UE activates the downlink carriers indicated as activated state in the downlink carrier state control message among the downlink carriers in the deactivated state currently. Next, the UE determines the downlink carriers to be deactivated at step 730. At this time, the UE deactivates the downlink carriers indicated as deactivated state in the downlink carrier state control message among the downlink carriers in the activated state currently. After completing the above procedure, the UE waits until a new downlink carrier state control message is received. If a new downlink carrier state control message is received, the procedure returns to step 720 and thus the UE performs the above operations, i.e. steps 720 to 730, again.

In the case that a cell is defined as a set of downlink and uplink carriers, the first embodiment of the present invention can be regarded as a method for activating or deactivating a cell. If the term 'downlink carrier' is replaced for the term 'cell', the method proposed in the first embodiment can be regarded as a method for activating or deactivating the cell.

For reference, if a downlink carrier is activated, this means that the UE receives control and data channels on the downlink carrier, if a cell is activated, this means that the UE receives the control and data channels on the downlink carrier of the corresponding cell and, if necessary, transmits control and data channel on the uplink carrier of the corresponding cell.

Second Embodiment

In the LTE mobile communication system, in order for the eNB to perform uplink scheduling based on the uplink channel condition, the UE can be configured to transmit SRS (Sounding Reference Signal) on uplink carrier. The SRS is transmitted for efficient scheduling and also can be used for tracking uplink transmission timing of the UE. In the case that multiple uplink carriers are aggregated for the UE, it essentially is most efficient to transmit SRS on all of the uplink carriers. However, since the SRS transmission resource is limited and the SRS transmission consumes battery power, it is not preferred for the UE to transmit SRS on all of the uplink carriers. Therefore, the second embodiment of the present invention proposes a method for allocating and withdrawing SRS transmission resource efficiently.

In the LTE-A mobile communication system, the cross-carrier scheduling is allowed. This means that it is possible to transmit scheduling information on multiple uplink carriers through a scheduling channel of a certain downlink carrier. For example, if a UE operates on three downlink carriers of DL CC 1 805, DL CC 2 810, and DL CC 815, and three uplink carriers of UL CC 1 820, UL CC 2 825, and UL CC 3 830, it is possible to configure to perform scheduling on all of the UL CC 820, 825, and 830 through DL CC 1 805 and scheduling on all of the DL CC 805, 810, and 815 through the DL CC 3 815. If an uplink grant is received on a certain DL CC 805, 810, or 815, the UE checks the Carrier Indicator Field (CIF) of the uplink grant to determine the target uplink carrier.

If it is allowed to transmit uplink grant for all uplink carriers through all downlink carriers configured with scheduling channels as described above, the scheduling can be performed for a certain uplink carrier always as far as all downlink carriers are deactivated. Although seen as advantageous, it has a shortcoming in that the UE has to prepare for uplink transmission on all uplink carriers. Furthermore, to guarantee the scheduling availability as far as possible as described above does not give special gain. For example, the gain acquired by making the uplink scheduling for UL CC 1 820 possible on a plurality of DL CCs is that, when overload occurs on the scheduling channel of a downlink carrier, it is possible to use another scheduling channel, however, since the size of the scheduling channel can be adjusted at every subframe, the overload occurrence probability is little. The main purpose of the cross-carrier scheduling is to restrict scheduling channel transmission on a specific DL CC 805, 810, or 815 for controlling inter-cell interference. For example, when no scheduling channel is transmitted on the DL CC 2 810, it is allowed to perform scheduling on the DL CC 2 810 and UL CC 2 825 through other DL CC 805 and 815.

Accordingly, the present invention defines the downlink carrier carrying the uplink grant for a certain uplink carrier is defined as the downlink carrier associated with the uplink carrier in view of scheduling and minimizes a number of downlink carriers associated with a certain uplink carrier in view of scheduling. The present invention also proposes a method for controlling SRS transmission on the uplink carriers in association with the activation state of the downlink carrier associated with the corresponding uplink carrier in view of scheduling. At this time, in the case that scheduling on a certain uplink carrier is available on all DL CCs allowed for scheduling transmission, although it is meaningless to associate the SRS transmission on the uplink carrier with a certain uplink channel in view of scheduling, if not associating all downlink channels carrying the scheduling channel with a certain uplink channel in view of scheduling, it is possible to adjust the activation state of the downlink carrier associated with the SRS transmission on the uplink carrier in view of scheduling. This can be described with an example.

Figure 9:
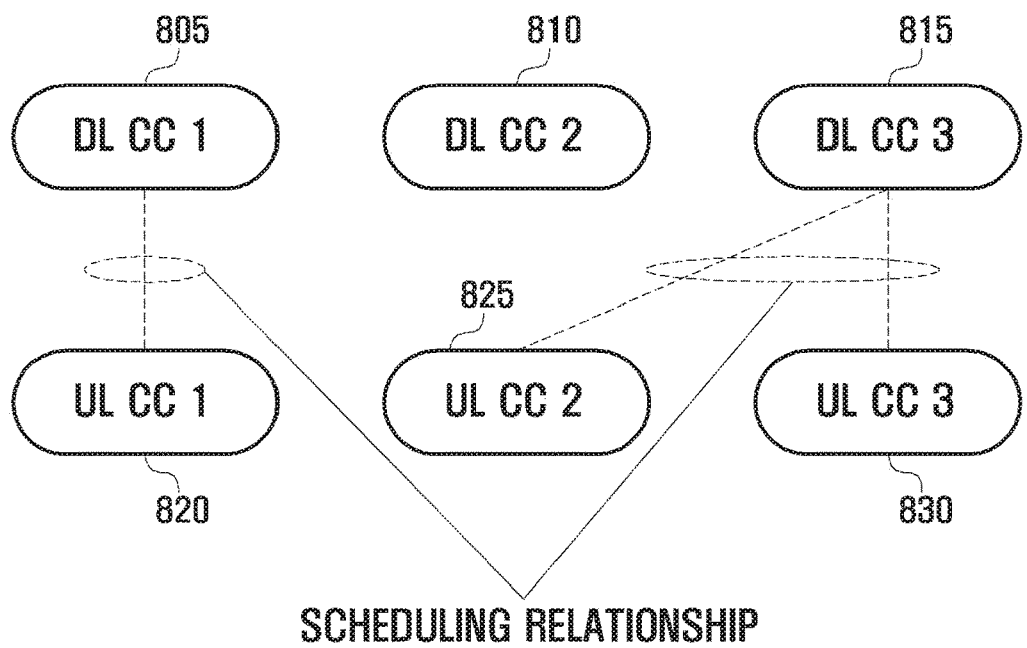
FIG. 9 is a diagram illustrating an example of the associations between downlink and uplink carriers in view of scheduling.

FIG. 9 is a diagram illustrating an example of the associations between downlink and uplink carriers in view of scheduling.

Referring to FIG. 9, when three downlink carriers of DL CC 1 805, DL CC 2 810, and DL CC 3 815 are aggregated and three uplink carriers of UL CC 1 820, UL CC 2 825, and UL CC 3 830 are aggregated for a UE, the DL CC 1 805 is associated with the UL CC 820 in view of scheduling, the DL CC 3 is associated with the UL CC 2 825 and UL CC 3 830 in view of scheduling, when the DL CC 1 805 is deactivated, it is impossible to receive uplink grant for the UL CC 1 820 any longer. If the DL CC 3 815 is deactivated, it is impossible to receive uplink grant for the UL CC 2 825 and UL CC 3 830 any longer. That is, it is advantageous no longer to transmit the SRS on the uplink carrier.

That is, the present invention controls such that preferably there exists only one downlink carrier having scheduling relationship with a certain downlink carrier and a part of the aggregated downlink carriers has the scheduling relationship with a certain uplink carrier and then, when at least a part of the downlink carriers having the scheduling relationship with a certain uplink carrier stays in the activated state, the SRS transmission is performed. That is, the uplink SRS transmission can be activated or deactivated according to whether the downlink carrier is activated or deactivated, and the activated state of the downlink carrier has a close relationship with the uplink SRS transmission. By taking notice of this, the second embodiment of the present invention proposes a method of combining the downlink carrier state control message with the SRS transmission resource allocation message. That is, if the downlink carrier state control message is received, the UE searches for the uplink carriers associated with the downlink carrier to be newly activated in view of scheduling. If the SRS transmission resource valid for the uplink carrier has been allocated, the UE activates the SRS transmission through the uplink carrier. At this time, the valid SRS transmission resource can be allocated by means of the downlink carrier state control message.

Figure 10:
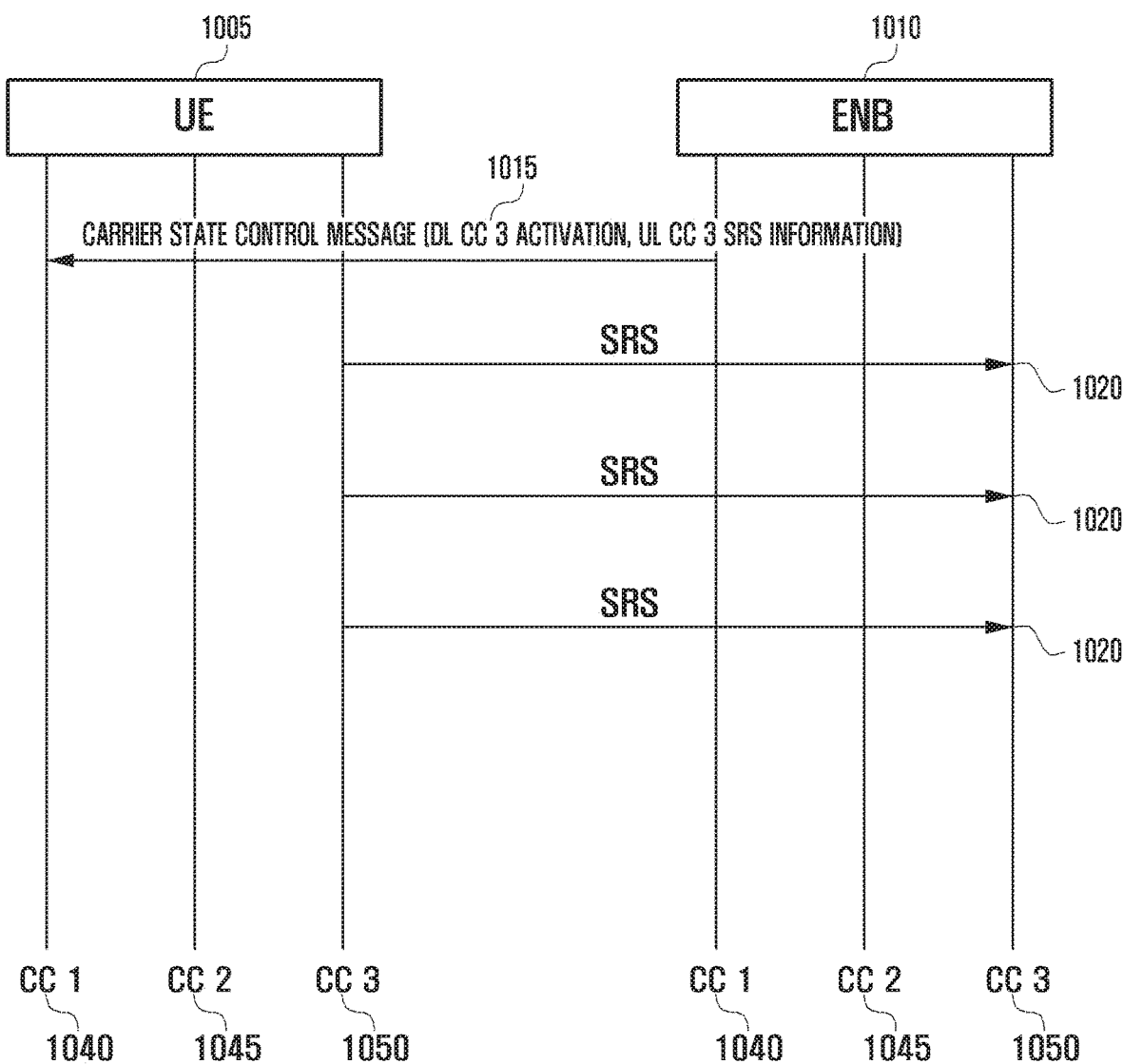
FIG. 10 is a signaling diagram illustrating the entire operation according to the second embodiment of the present invention.

FIG. 10 is a signaling diagram illustrating the entire operation according to the second embodiment of the present invention.

Referring to FIG. 10, the eNB 1010 determines to activate the SRS transmission on a certain uplink carrier, e.g. uplink carrier 3 1050, at a certain time point. If the SRS transmission of a certain UE 1005 is activated on a certain uplink carrier, this means that the UE 1005 performs SRS transmission at a period determined by the UE 1010 at a time point determined by the eNB 1010 using the transmission resource allocated by the eNB 1010 on the uplink carrier. For example, if the uplink data amount to be transmitted by the UE 1005 increases, the eNB is capable of activating SRS to allocate uplink transmission resource efficiently. Afterward, the eNB 1010 is capable of allocating the transmission resource of the frequency having the best reception quality by referencing the quality of the SRS signal.

In order to accomplish this, the eNB 1010 first determines whether the downlink carrier associated in view of scheduling with the uplink carrier to be activated for SRS transmission is in the activated state or the deactivated state and, if the downlink carrier is in the deactivated state, generates the downlink carrier state control message for activating the downlink carrier. At this time, if the uplink carrier 3 and the downlink carrier 3 are associated in view of scheduling with each other, the eNB 101 configures the downlink carrier state control message to activate the downlink carrier 3. The downlink carrier state control message also includes the information related to the SRS transmission resource of the uplink carrier 3. The information related to the SRS transmission resource includes Resource Block for transmitting SRS and code for use in SRS transmission. If the transmission resource information is received, the UE 1005 transmits SRS using the transmission resource at a predetermined time point at a predetermined period.

That is, if the downlink carrier state control message is received at step 1015, the UE 1005 activates an appropriate downlink carrier as indicated by the downlink carrier state control message. If the downlink carrier state control message includes the SRS information on the uplink carrier, the UE allocates SRS resource indicated by the SRS information to the uplink carrier. After processing the control message, the UE determines whether the SRS resource has been allocated and whether there is an uplink carrier associated with the downlink carrier in view of scheduling is activated, and it such carrier exist, activates the uplink SRS transmission on the corresponding carrier at step 1020.

Figure 11:
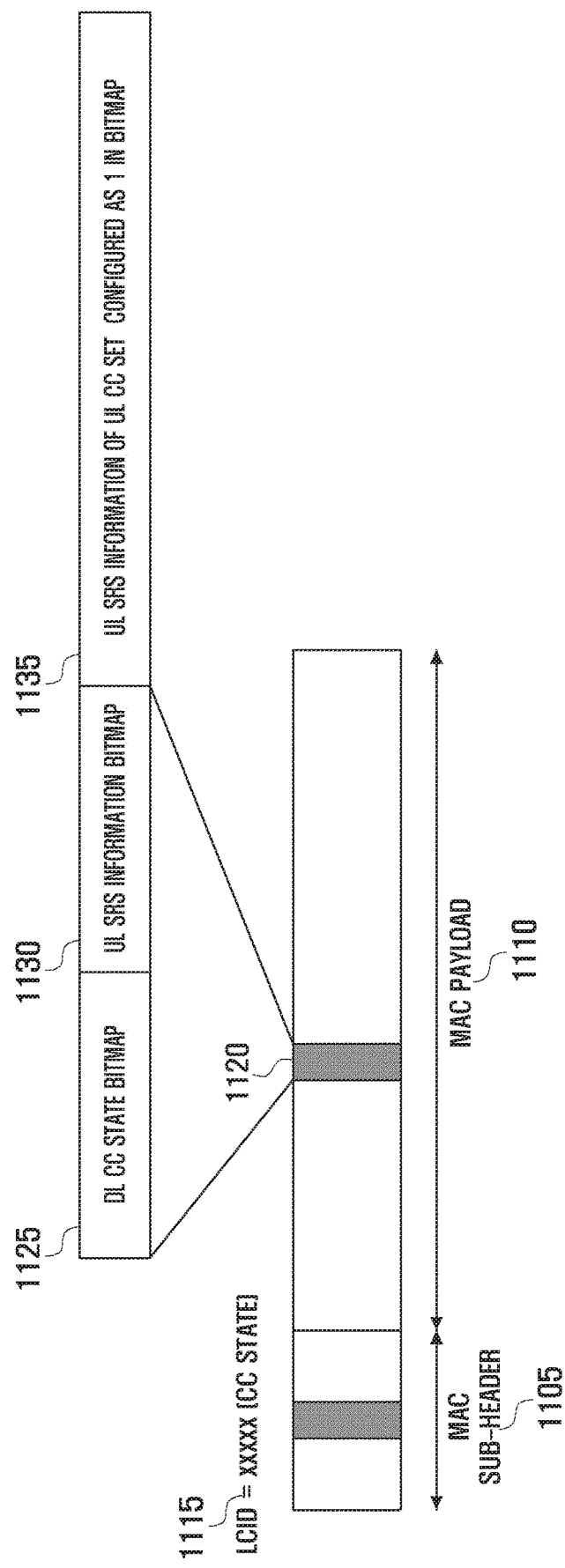
FIG. 11 is a diagram illustrating an example of the downlink carrier state control message including SRS information.

FIG. 11 is a diagram illustrating an example of the downlink carrier state control message including SRS information. The detailed description that has been made already with reference to FIG. 6 is omitted herein.

Referring to FIG. 11, the downlink carrier state control message includes two bitmaps 1125 and 1130, the first bitmap 1125 for uplink carrier state indication and the second bitmap 1130 for SRS information presence indication. Each bit of the second bitmap 1130 matches each of uplink carriers aggregated for the UE one by one and set to 1 for indicating the SRS information on the corresponding uplink carrier is included. As described above, the SRS information may include the resource block for transmitting the SRS signal and the code for use in the SRS transmission. If the SRS transmission resource is allocated by means of the downlink carrier state control message, the UE regards that the resource has been allocated on the corresponding carrier until the allocated resource is withdrawn. As described above, whether to transmit the SRS signal using the allocated resource is determined by referencing whether the downlink carrier associated with the corresponding downlink carrier in view of scheduling is activated.

Figure 12:
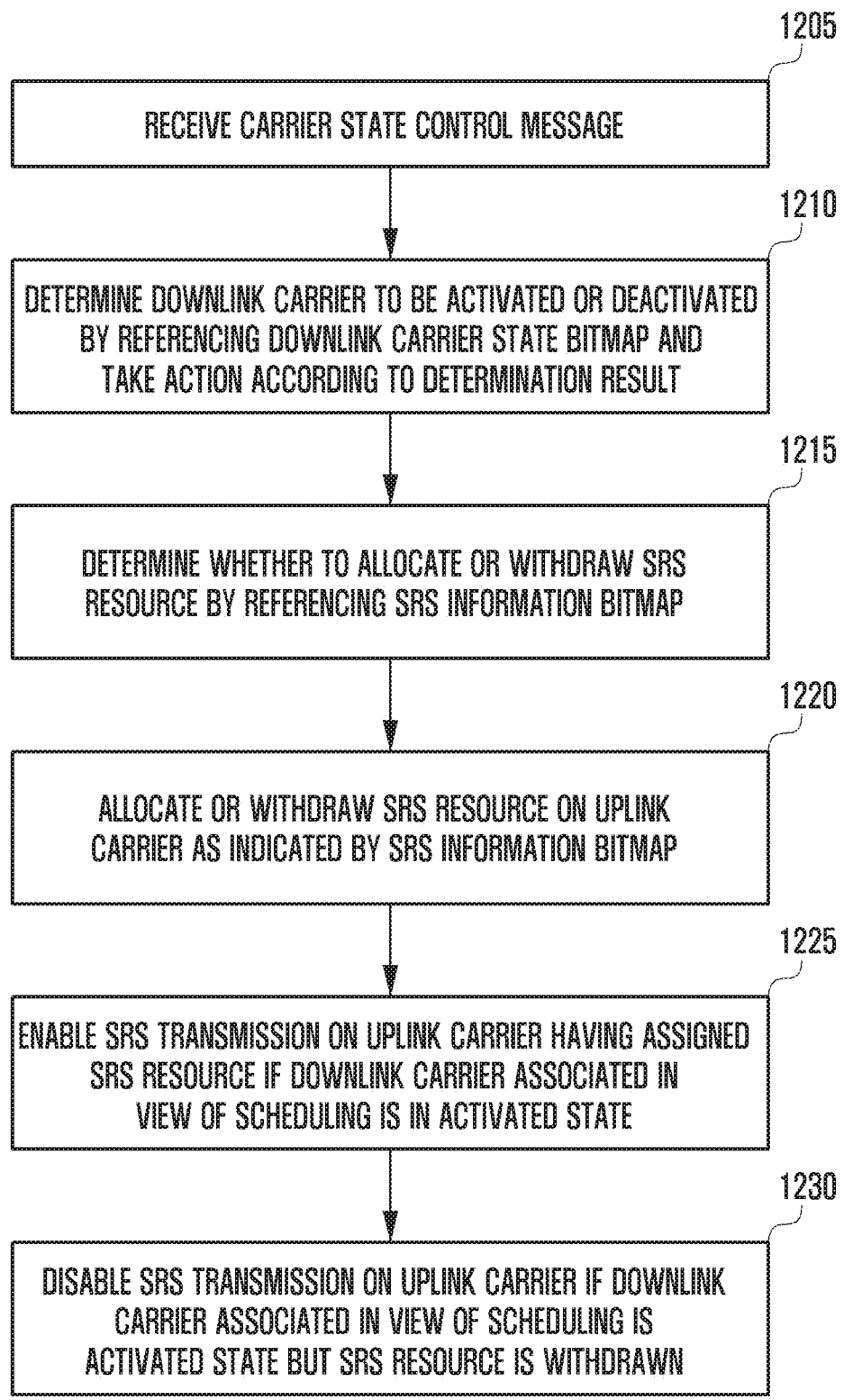
FIG. 12 is a flowchart illustrating the UE operation according to the second embodiment of the present invention.

FIG. 12 is a flowchart illustrating the UE operation according to the second embodiment of the present invention.

Referring to FIG. 12, if the downlink carrier state control message is received at step 1205, the UE checks the downlink carrier state bitmap to determine the downlink carrier to be newly activated or deactivated and activates or deactivates the downlink carrier according to the determination result at step 1210. Next, the UE checks the SRS information bitmap to detect the uplink carrier changed in SRS resource at step 1215. For example, the uplink carrier for which the corresponding bit of the bitmap is set to 1 has change in SRS resource. Afterward, the UE checks the SRS information included in the carrier state control message and takes an appropriate action at step 1220. The SRS information includes SRS resource information per uplink carrier of which bit is set to 1. The UE allocates the SRS resource indicated by the SRS resource information onto the corresponding uplink carrier. If the SRS resource has been allocated onto the corresponding uplink carrier, the UE releases the allocated SRS resource and use the newly allocated SRS resource. Otherwise, if the SRS resource information is configured with predetermined values, e.g. all zero bits, the UE withdraws the SRS resource allocated onto the corresponding uplink carrier.

Next, the UE determines whether the downlink carrier associated in view of scheduling is in the activated state and whether there is an uplink carrier allocated SRS resource, and then activates the SRS transmission on the uplink carrier at step 1225. Next, the UE deactivates the SRS transmission on the plink carrier where the downlink carrier associated in view of scheduling is in the activated state but the SRS resource is withdrawn at step 1230.

Third Embodiment

The third embodiment of the present invention proposes a method for withdrawing SRS resource implicitly when the downlink carrier associated in scheduling is deactivated, rather than withdrawing the SRS resource explicitly. As described above, if all downlink carriers associated in view of scheduling are deactivated, uplink carrier scheduling becomes impossible, resulting in degradation of SRS transmission efficiency. Accordingly, it is preferred to disable the SRS transmission. As described above, the SRS transmission resource is limited and thus, when the SRS transmission is disabled, it is preferred to withdraw the previously allocated SRS transmission resource too; however, if extra SRS information is included for the resource withdrawal, this increases signaling overhead. In order to overcome this problem, the third embodiment of the present invention proposes a method for disabling SRS transmission and withdrawing the SRS resource on the corresponding uplink carrier when all of the downlink carriers associated in view of scheduling are deactivated.

Figure 13:
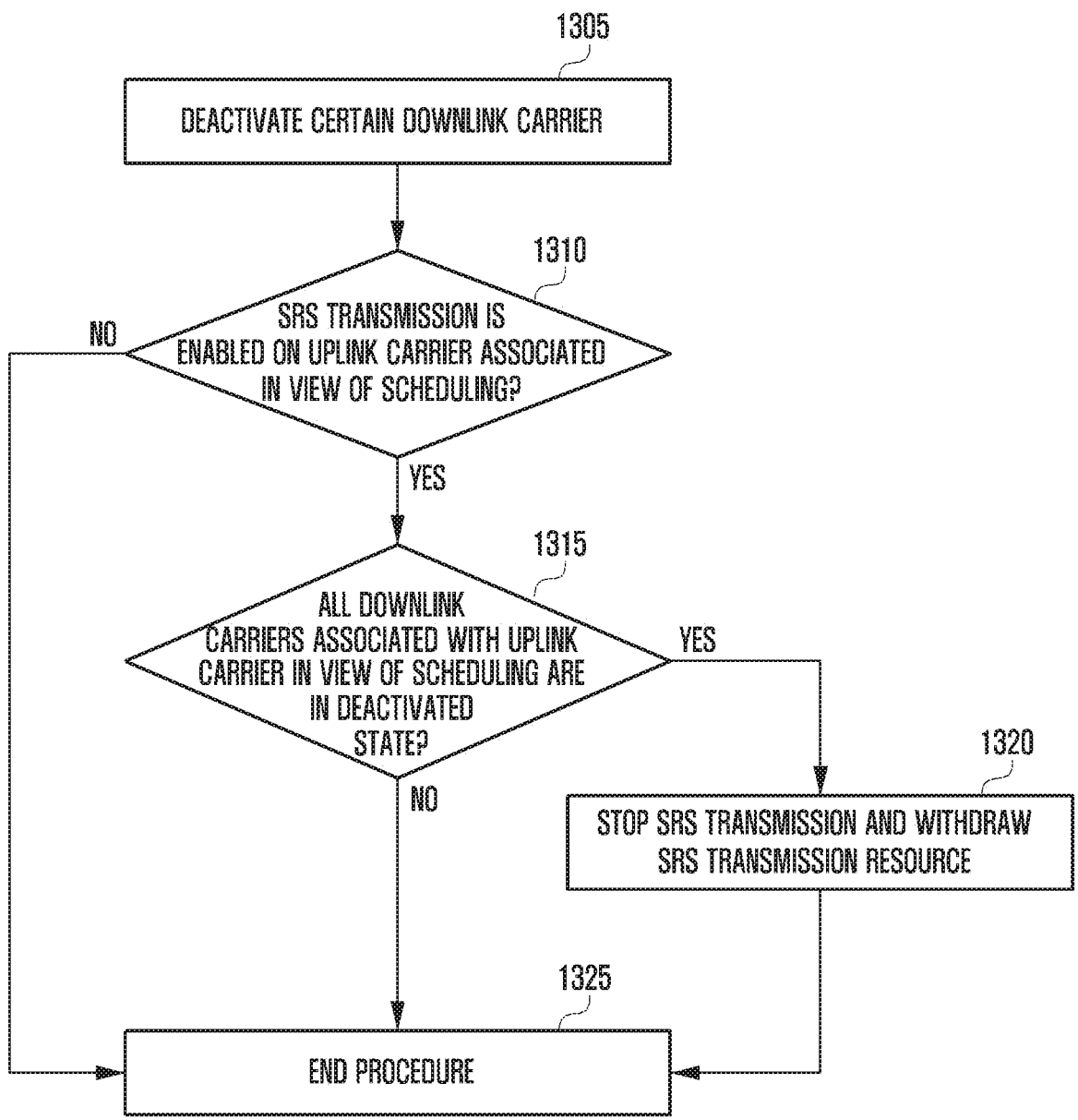
FIG. 13 is a flowchart illustrating the UE operation according to the third embodiment of the present invention.

FIG. 13 is a flowchart illustrating the UE operation according to the third embodiment of the present invention.

Referring to FIG. 13, if a certain downlink carrier is deactivated at step 1305, the procedure goes to step 1310. The UE determines whether the SRS transmission is enabled on the uplink carrier associated with the deactivated downlink carrier in view of scheduling at step 1310. If the SRS transmission is enabled, the UE determines whether all downlink carriers associated in view of scheduling with the uplink carrier are deactivated at step 1315. Here, if there is only one downlink carrier associated with the uplink carrier in view of scheduling, the UE always determines that the downlink carrier is in the deactivated state at step 1315. If it is determined that all downlink carriers are deactivated, the UE disables SRS transmission and releases the SRS transmission resource on the uplink carrier at step 1320. Finally, the UE ends the procedure at step 1325.

Also, it is possible to classify the state of an uplink carrier into the activated state or the deactivated state and, if a certain uplink carrier is in the deactivated state, disables the uplink transmission on the uplink carrier. In order to accomplish this, it is necessary to define the UE operation for releasing the dedicated transmission resource allocated on the uplink carrier and linking the activated/deactivated state of the uplink carrier to the activated/deactivated state of the downlink carrier associated in view of scheduling.

Figure 14:
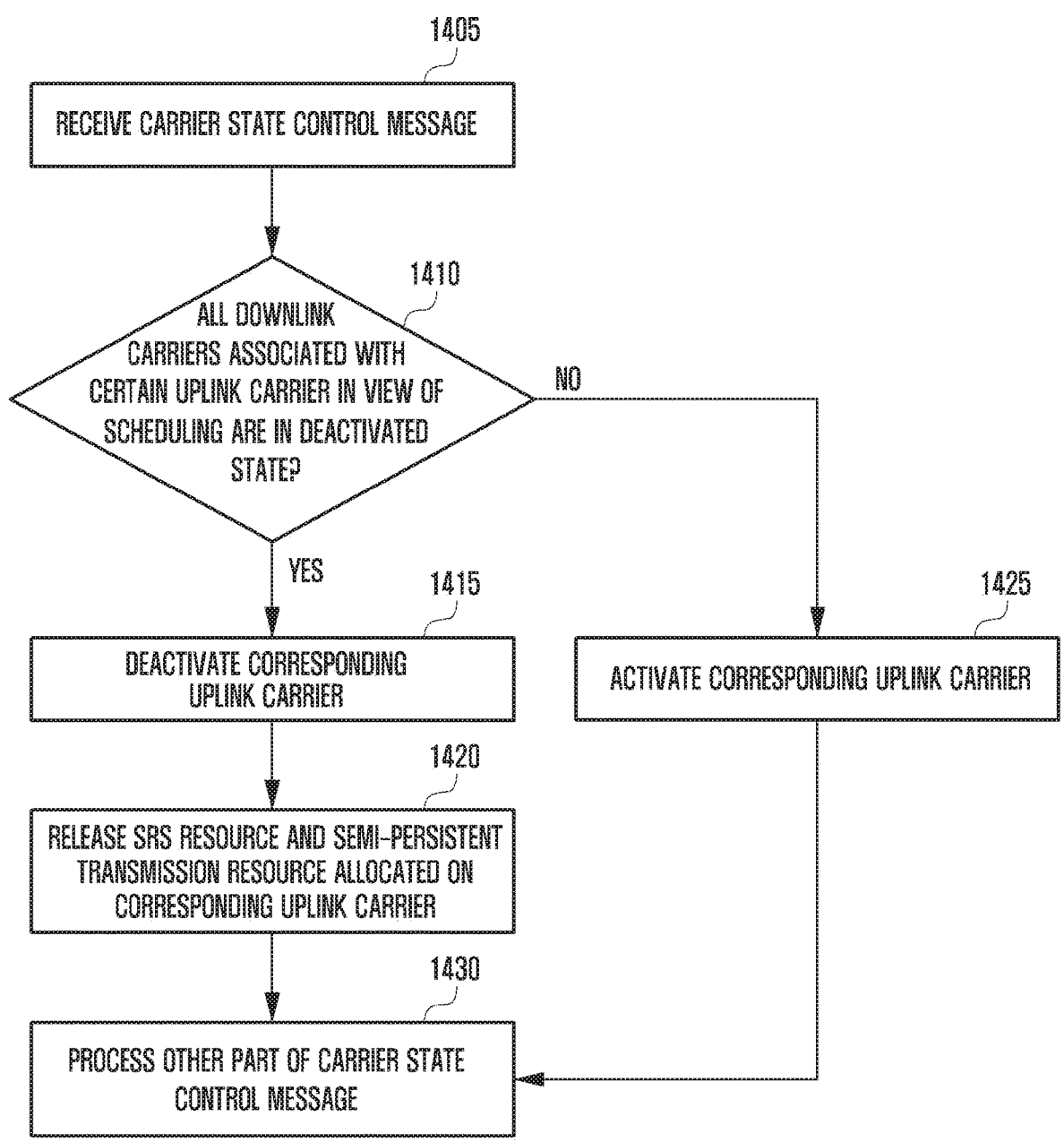
FIG. 14 is a flowchart illustrating another UE operation according to the third embodiment of the present invention.

FIG. 14 is a flowchart illustrating another UE operation according to the third embodiment of the present invention.

Referring to FIG. 14, if the carrier state control message is received at step 1405, the UE activates or deactivates the downlink carrier as indicated by the control message. That is, the UE determines whether to activate or deactivate the uplink carrier by activating or deactivating the downlink carrier at step 1410. At this time, the UE determines whether the downlink carriers associated in view of scheduling with each uplink carrier are all deactivated or partially or entirely activated at step 1410.

Next, if all downlink carriers associated in view of scheduling with the uplink carrier are in the deactivated state, the procedure goes to step 1415. At step 1415, the UE deactivates the corresponding uplink carrier. Next, the UE releases the SRS resource and semi-persistent transmission resource allocated to the corresponding uplink carrier at step 1420, and the procedure goes to step 1430. Here, the semi-persistent transmission resource is the transmission resource allocated to the UE periodically without extra uplink grant for supporting the service generating small and constant data traffic such as VoIP.

Otherwise, if the determination result is false for a certain uplink carrier at step 1410, i.e. if some or all of the downlink carriers associated in view of scheduling with the uplink carrier are in the activated state, the procedure goes to step 1425. At step 1425, if the uplink carrier is in the deactivated state, the UE activates the uplink carrier, and the procedure goes to step 1430. The UE processes the rest part of the carrier state control message, e.g. allocates SRS resource according to the SRS resource information, at step 1430 and ends the procedure.

Fourth Embodiment

The first embodiment of the present invention has proposed the method for activating or deactivating the downlink carrier using the control message indicating the state of the downlink carrier. The first embodiment is advantageous from the view point of signaling overhead minimization but increases the UE complexity because the procedure divided into two phases, i.e. comparing the preferred carrier state indicated in the received message with the current carrier state and determining whether to activate or deactivate depending on the comparison result. The fourth embodiment of the present invention proposes a method for minimizing the signal overhead without compromising UE complexity.

In order to accomplish this, in the fourth embodiment of the present invention, the bitmap indicating preferred states of uplink carriers used in the above-described first embodiment is utilized with the new definition on the bit value as follows.

0: maintain current state of corresponding downlink carrier

1: change state of corresponding downlink carrier, i.e. activate deactivated carrier or deactivate activated carrier By configuring the bitmap as described above, the UE activates or deactivates the downlink carrier indicated by the bit set to 1 n the bitmap and maintains the current states of other carriers such that it becomes unnecessary to compare the carrier state indicated in the received bitmap with the current carrier state to determine whether to change the state of a downlink carrier.

Figure 15:
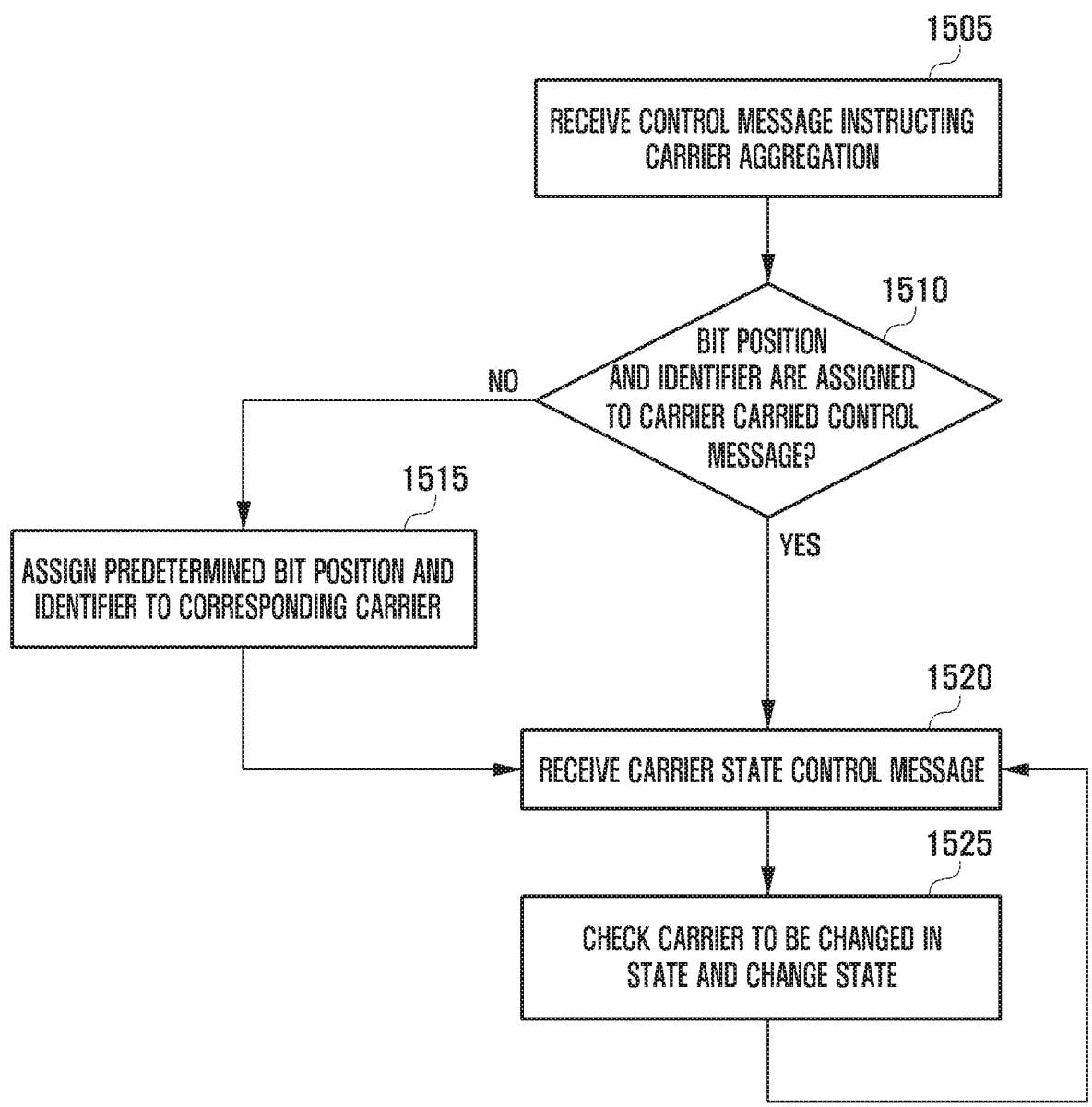
FIG. 15 is a flowchart illustrating the UE operation according to the fourth embodiment of the present invention.

FIG. 15 is a flowchart illustrating the UE operation according to the fourth embodiment of the present invention.

In FIG. 15, since steps 1505, 1510, and 1515 are identical with steps 705,710, and 715 of FIG. 7, detailed descriptions thereon are omitted herein. Afterward, if the downlink carrier state control message is received at step 1520, the UE checks the downlink carrier to be changed in state and changes the state of the corresponding downlink carrier at step 1525. That is, the downlink carrier in the activated state transitions to the deactivated state, and the downlink carrier in the deactivated state transitions to the activated states. In order to accomplish this, the UE regards the downlink carriers of which corresponding bit is set to 1 in the control message as the downlink carrier to be changed in state. After performing the above operation, the UE waits until a new downlink carrier state control message. If the new downlink carrier state control message is received, the UE returns the procedure to step 1520 to perform the above-described operations again, i.e. steps 1520 and 1525.

However, if the UE and the eNB assume different states for the same carrier in the above described embodiment, a malfunction may occur. That is, although the eNB has indicated the activated state for a certain carrier while the eNB may deactivate the corresponding carrier. In order to overcome this problem, it is to discriminate between carrier activation command and carrier deactivation command although using the bitmap for indicating the preferred states of the downlink carriers. At this time, the bit value 1 indicates activation of the corresponding carrier and 0 indicates the state maintenance of the corresponding carrier in the bitmap of the carrier activation command, and the bit value 1 indicates deactivation of the corresponding carrier and 0 indicates the state maintenance of the corresponding carrier in the bitmap of the carrier deactivation command.

Figure 16:
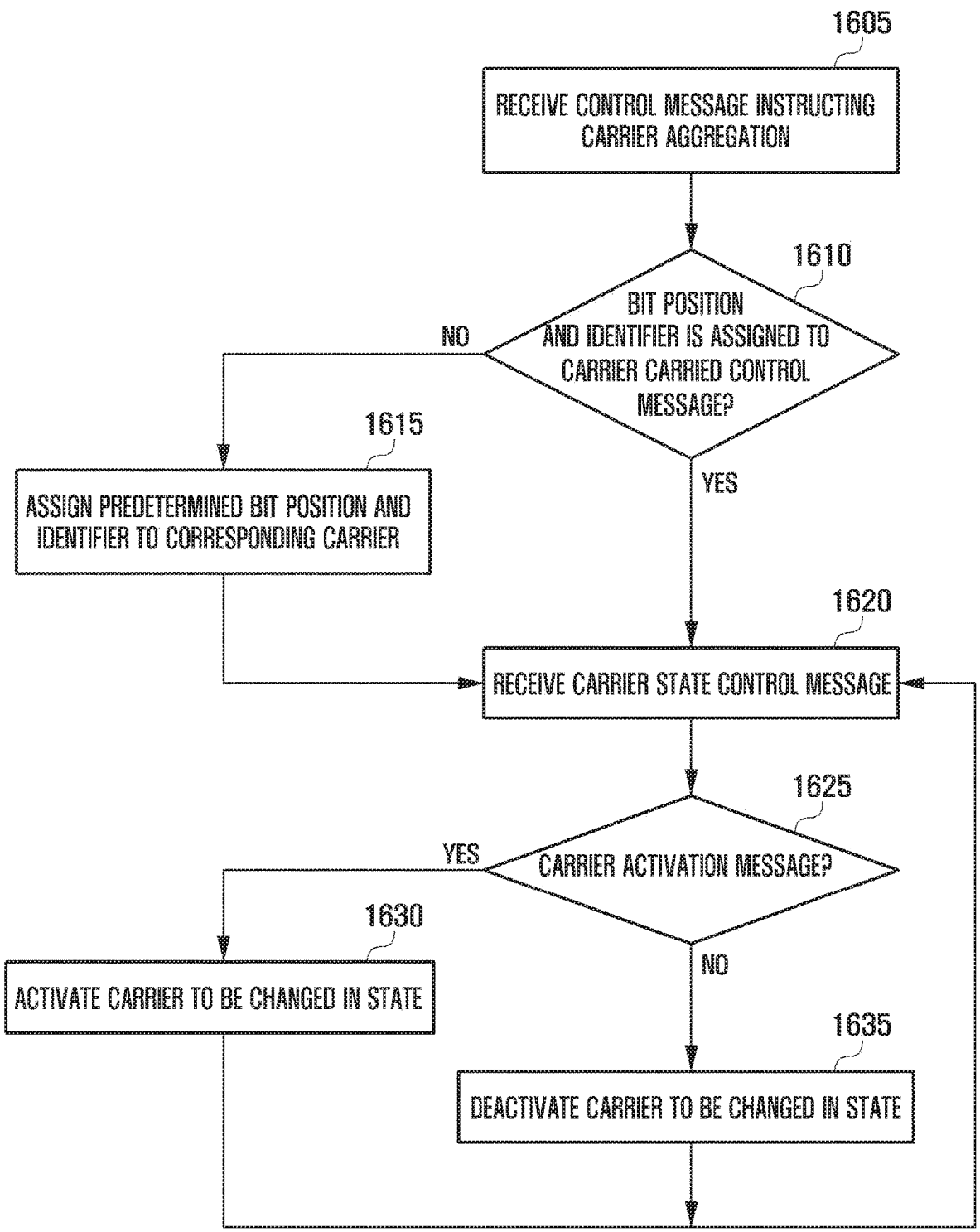
FIG. 16 is a flowchart illustrating another UE operation according to the fourth embodiment of the present invention.

FIG. 16 is a flowchart illustrating another UE operation according to the fourth embodiment of the present invention.

In FIG. 16, since steps 1605, 1610, and 1615 are identical with steps 705, 710, and 715 of FIG. 7, detailed descriptions thereon are omitted. Afterward, if the control message is received at step 1620, the UE determines whether the control message is the downlink carrier activation message or downlink carrier deactivation message at step 1625. At this time, the downlink carrier activation message and downlink carrier deactivation message are allocated a logical channel identifier. The UE determines the type of the control message using the logical channel identifier of the received control message. If it is determined that the received control message is the downlink carrier activation message at step 1625, the UE activates the downlink carrier of which corresponding bit is set to 1 in the bit map of the message at step 1630. Otherwise, if it is determined that the received control message is the downlink carrier deactivation message at step 1625, the UE deactivates the downlink carrier of which corresponding bit is set to 1 in the bit map of the message at step 1635. Next, the UE waits until a new downlink carrier state control message is received. If the new downlink carrier state control message is received, the UE returns the procedure to step 1620 and performs the above-described operations, i.e. steps 1620 to 1635, again.

A description is made of the configuration of the UE apparatus for performing the above-described operations according to the embodiments of the present invention.

Figure 17:
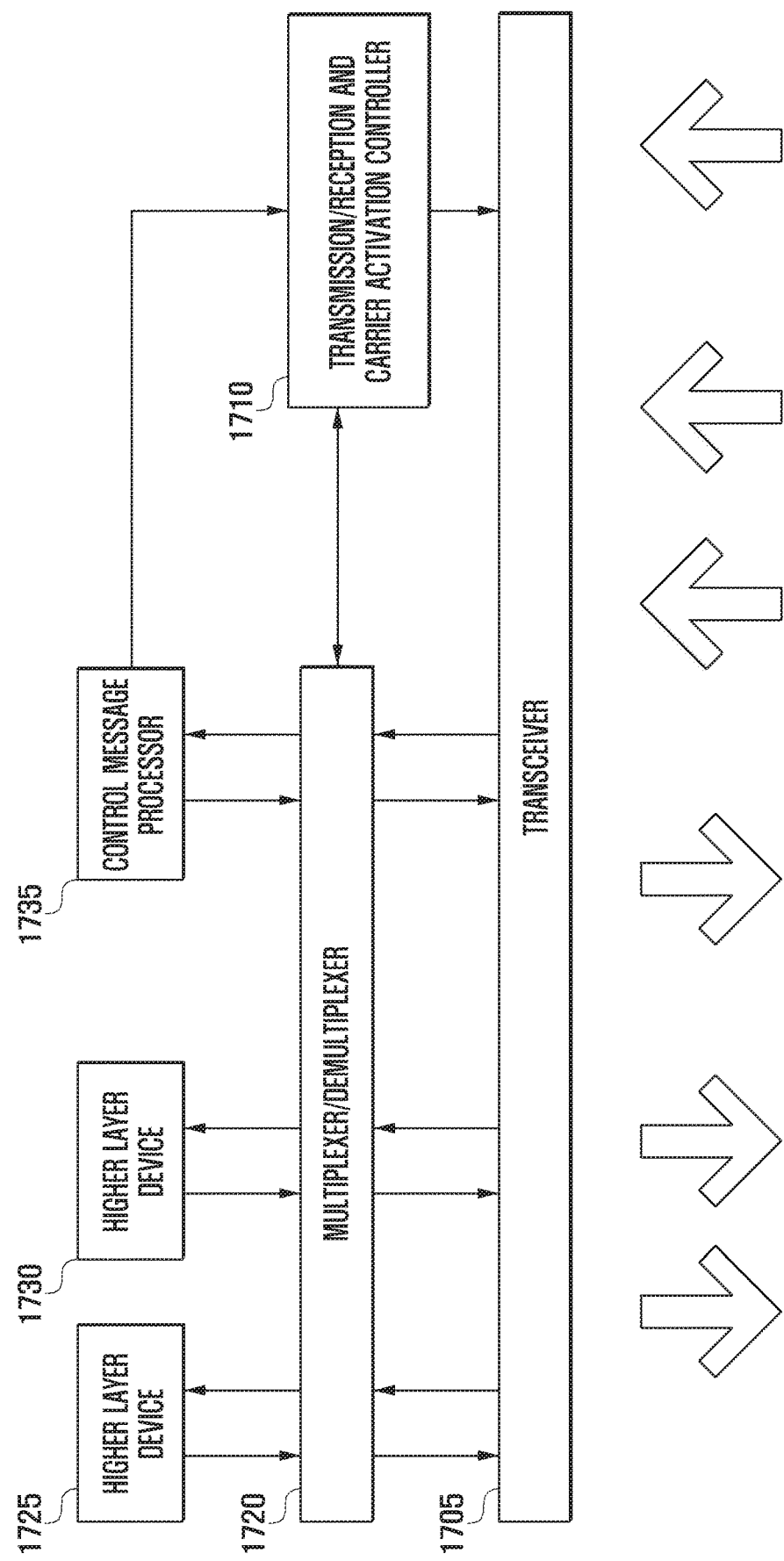
FIG. 17 is a block diagram illustrating a configuration of the UE apparatus according to the first to fourth embodiment of the present invention.

FIG. 17 is a block diagram illustrating a configuration of the UE apparatus according to the first to fourth embodiment of the present invention.

Referring to FIG. 17, the UE apparatus includes a transceiver 1705, a transmission/reception and carrier activation controller 1710, a multiplexer/demultiplexer 1720, a control message processor 1735, and higher layer devices 1725 and 1730.

The transceiver 1705 receives data and predetermined control signals on the downlink carrier and transmits data and control signals on the uplink carrier. In the case that multiple carriers are aggregated, the transceiver transmits and received the data and control signals over the multiple carriers.

The transmission/reception and carrier activation controller 1710 interprets the downlink carrier state control message transmitted by the eNB and control activation and deactivation of the downlink carrier. The transmission/reception and carrier activation controller 1710 checks activation/deactivation state of the downlink carrier and determines whether to enable SRS transmission on the uplink carrier. According to the determination result, the transmission/reception and carrier activation controller 1710 controls SRS transmission.

The multiplexer/demultiplexer 1720 multiplexes the data generated by the higher layer devices 1725 and 1730 and/or control message processor 1735 or demultiplexes the data received by the transceiver 1705 and delivers the demultiplexed data to appropriate higher layer devices 1725 and 1730 and/or the control message processor 1735. The multiplexer/demultiplexer 1720 multiplexes the downlink carrier state control message and delivers the multiplex result to the transmission/reception and carrier activation controller 1710.

The control message processor 1735 processes the control message transmitted by the network and takes an appropriate action. For example, the control message processor 1735 sends the carrier information included in the control message to the transmission/reception and carrier activation controller 1710. The higher layer device 1725 or 1730 is activated per service to process the data generated by a user service such as FTP or VoIP to the multiplex part of the multiplexer/demultiplexer 1720 or process the data output by the demultiplex part of the multiplexer/demultiplexer 1720 to the service application on the higher layer.

Although not shown in the drawing, the eNB apparatus according to the above-described embodiments includes a transceiver, a controller, etc.

The transceiver transmits data and predetermined control signals on the downlink carrier and receives data and predetermined control signals on the uplink carrier. In the case that multiple carriers are aggregated, the transceiver transmits and received data and control signals on the multiple carriers.

The controller controls the transmission of the indication message and downlink carrier state control message. The controller also controls the activation and deactivation of the downlink carriers.

Fifth Embodiment

The fifth embodiment of the present invention proposes a method for configuring the association relationship between the downlink and uplink carrier efficiently in aggregation multiple carriers for a UE.

For uplink data transmission, a certain uplink carrier has to establish various association relationships with predetermined downlink carriers. In more detail, it has to be configured in advance that which downlink carrier is used for uplink grant corresponding to a certain uplink carrier (hereinafter, referred to as association relationship in view of uplink scheduling), which downlink carrier is used as pathloss reference in uplink transmission power configuration of a certain uplink carrier (hereinafter, referred to as association relationship in view of pathloss), and which uplink carrier is targeted by the uplink Transmission Power Control (TPC) received through a certain downlink carrier (hereinafter, referred to as association relationship in view of TPC).

The fifth embodiment of the present invention proposes a method and apparatus for configuring the diverse association relationships between uplink and downlink carriers in such a way of defining relationship identifiers to be assigned to the downlink and uplink carriers such that the uplink carrier assigned a certain relationship identifier has a basic association relationship with the downlink carrier assigned the same relationship identifier and, unless other association relationship is signaled explicitly, applies the basic association relationship to the relationship configuration. Through this, it is possible to configure the diverse association relationships between the multiple downlink carriers and multiple uplink carriers efficiently.

Figure 18:
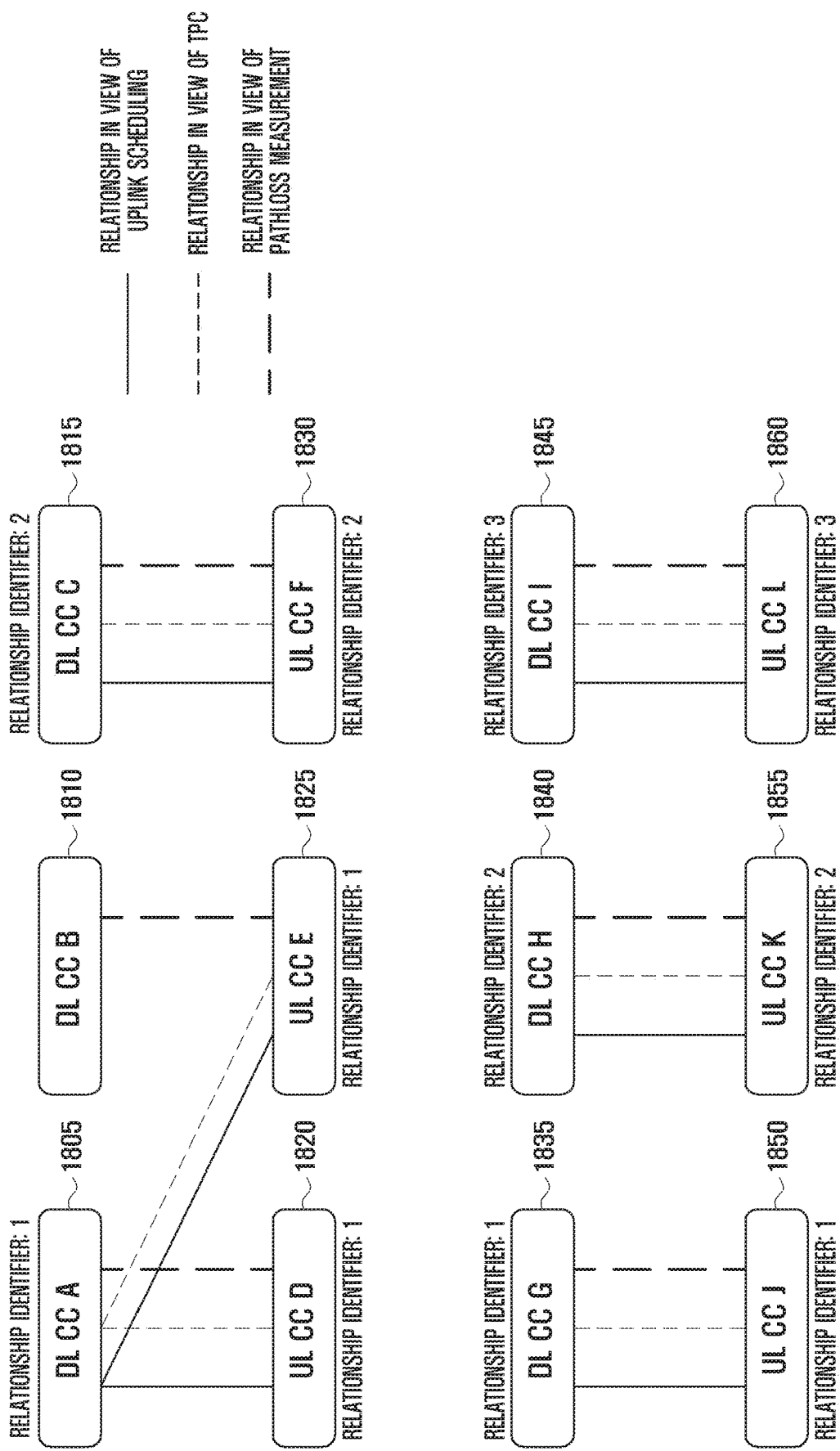
FIG. 18 is a diagram illustrating an example of association relationship between downlink and uplink carriers.

FIG. 18 is a diagram illustrating an example of association relationship between downlink and uplink carriers.

FIG. 18 is directed to an example case where downlink carrier 1805, downlink carrier B 1810, downlink carrier C 1815, uplink carrier D 1820, uplink carrier E 1825, and uplink carrier F1830 are aggregated. At this time, the downlink carrier A 1805 and the uplink carrier D 1820, the downlink carrier A 1805 and the uplink carrier E 1825, and the downlink carrier C 1815 and the uplink carrier F 1830 have having association relationships in view of uplink scheduling, respectively. Also, the downlink carrier A 1805 and the uplink carrier D 1820, the downlink carrier B 1810 and the uplink carrier E 1825, and the downlink carrier C 1815 and the uplink carrier F 1830 have the association relationships in view of TPC, respectively. Also, the downlink carrier A 1805 and the uplink carrier D 1820, the downlink carrier B 1810 and the uplink carrier E 1825, and the downlink carrier C 1815 and the uplink carrier F have the association relationships in view of pathloss, respectively.

In this case, the system assigns the same relationship identifier, i.e. 1, to the downlink carrier A 1805 which has the most association relationship with the uplink carrier D 1820. Also, the system assigns the same relationship identifier, e.g. 2, to the downlink carrier B 1810 has the most association relationship with the uplink carrier E 1825. The system assigns the same identifier, e.g. 3, to the downlink carrier C 1815 which as the most relationship with the uplink carrier F 1830. The system signals explicitly that the downlink carrier associated with the uplink carrier E 1825 in view of uplink scheduling is the downlink carrier A 1805. Through this, the UE configures the other association relationship using the relationship identifier, with the exception of the explicitly signaled association relationship in view of uplink scheduling between the uplink carrier E 1825 and downlink carrier A 1805.

Also, it is assumed that the downlink carrier G 1835, downlink carrier H 1840, downlink carrier I 1845, uplink carrier J 1850, uplink carrier K 1855, and uplink carrier L 1860 are aggregated. At this time, the downlink carrier G 1835 and the uplink carrier J 1850, the downlink carrier H 1840 and the uplink carrier K 1855, and the downlink carrier I 1845 and the uplink carrier L 1860 have the association relationships in view of uplink scheduling, TPC, and pathloss.

In this case, the system assigns the same relationship identifier, e.g. 1, to the downlink carrier G 1835 and the uplink carrier J 1850. The system also assigns the same relationship identifier, e.g. 2, to the downlink carrier H 1840 and the uplink carrier K 1855. The system also assigns the same relationship identifier, e.g. 3, to the downlink carrier I 1845 and the uplink carrier L 1860. Through this, the UE configures the association relationship between the uplink and downlink carriers.

The system is capable of configure the association relationship per UE. Alternatively, the system is capable of configuring the association relationships using predetermined association relationships between the uplink and downlink carriers, e.g. the relationships defined based on the frequency band and default downlink/uplink frequency gap. For example, if the downlink carrier A and the uplink carrier D belongs to the same frequency band and have the default downlink/uplink gap, the eNB may always allocate the same relationship identifier to the downlink carrier A and uplink carrier D. Also, if the system information on the downlink carrier A indicates the uplink carrier D as the associated uplink carrier, the system may assign the same relationship identifier to the downlink carrier A and the uplink carrier D. Typically, one cell consists of one downlink carrier and one uplink carrier. At this time, the downlink carrier and uplink carrier of the same cell can be assigned the same cell index, and the relationship identifier of the present invention can be identical with the cell identifier.

That is, the basic association relationship defined by the relationship identifier may be different or identical among the multiple UEs.

Figure 19:
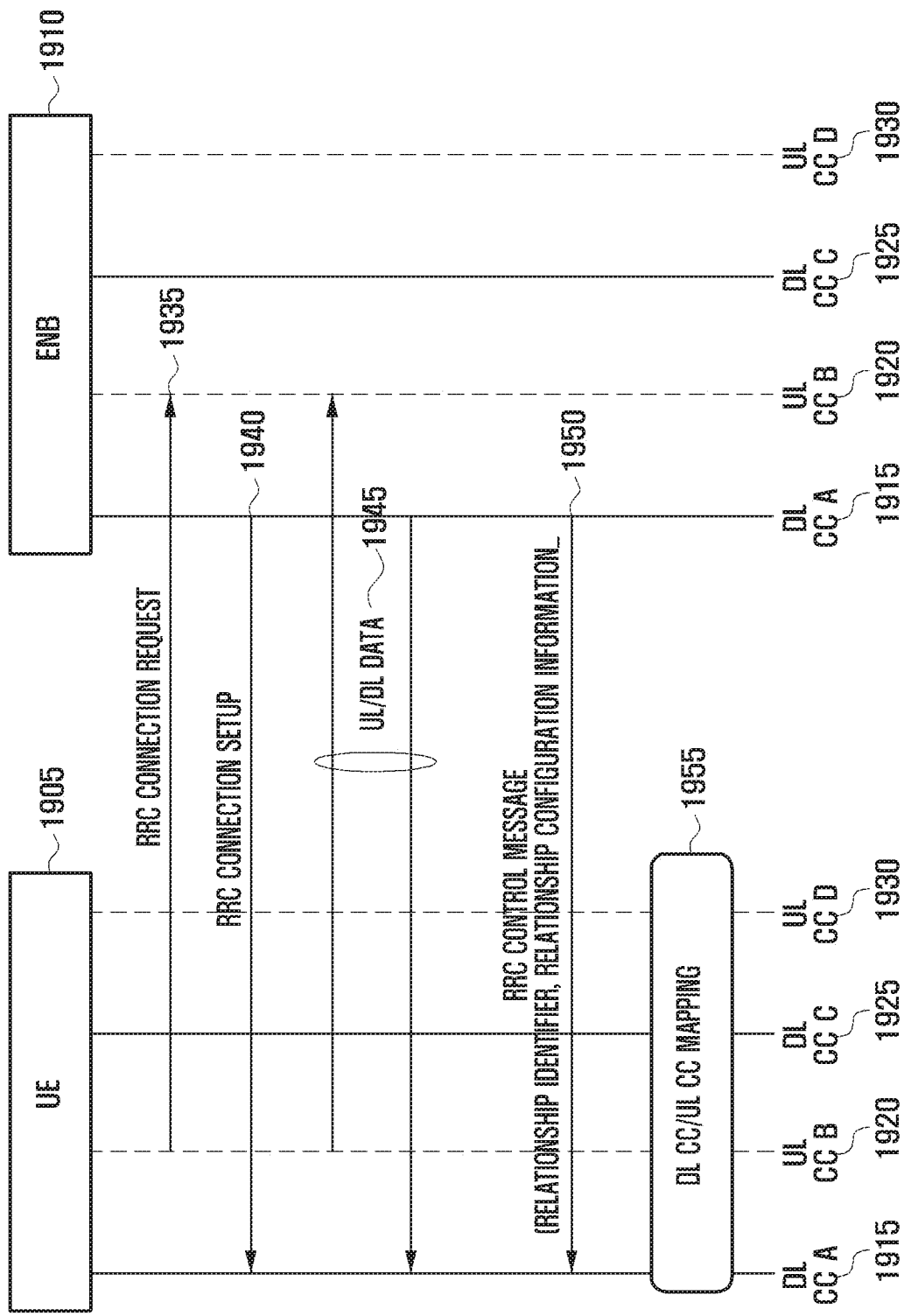
FIG. 19 is a signaling diagram illustrating the entire operation according to the fifth embodiment of the present invention.

FIG. 19 is a signaling diagram illustrating the entire operation according to the fifth embodiment of the present invention.

Referring to FIG. 19, the eNB 1910 and the UE 1905 start communication using one downlink carrier and on uplink carrier. For example, the UE 1905 transmits an RRC connection request message on the uplink carrier B 1920 at step 1935 and receives an RRC connection setup message on the uplink carrier B 1920 at step 1940 so as to establish the RRC connection with the eNB 1910. Next, the UE 1905 performs downlink/uplink data communication with the eNB 1910 through the downlink carrier A 1915 and the uplink carrier B 1920 at step 1945. Until then, the association relationships are clear from all view points since there exists only one downlink carrier and one uplink carrier. Afterward, if the required data amount of the UE 1905 increases at a certain time point, the eNB transmits a predetermined RRC control message to aggregate additional carriers for the UE 1905 at step 1950. Assuming that the downlink carrier C 1925 and the uplink carrier D 1930 are further aggregated, the eNB 1910 generates the RRC control message including the information about the carriers to be aggregated, e.g. center frequency and bandwidth of the carrier and Physical Cell ID (PCI) of the cell in which the UE 1905 communicates data on the corresponding carrier.

In this embodiment, the relationship identifiers of the individual carriers 1915, 1920, 1925, and 1930 are signaled explicitly or implicitly for the association relationship configuration of the carriers 1915, 1920, 1925 and 1930 to be aggregated in the control message. As described above, certain uplink carriers 1920 and 1930 have basic association relationship with the downlink carriers 1915 and 1925 allocated the same relationship identifier, and the basic association relationship is applied to the association relationships with the exception of the association relationship configured through the explicit signaling. For example, if the downlink carrier C 1925 and the uplink carrier D 1930 are assigned the same relationship identifier and if the downlink carrier A 1915 is explicitly configured to be associated with the uplink carrier D 1930 in view of pathloss, the uplink carrier D 1930 is associated with the downlink carrier A 1915 in view of pathloss as indicated explicitly, and the other association relationships, e.g. the association relationship in view of scheduling or uplink TPC, are established with the downlink carrier C 1925 having the same relationship identifier.

Here, the relationship identifier can be determined according to a predetermined rule. For example, the relationship identifier can be assigned in the order of the downlink carrier information and uplink carrier information arranged in the control message for carrier aggregation. That is, if the control message includes the downlink carrier X information, uplink carrier Y information, downlink carrier Z information, and uplink carrier W information arranged in sequence, a rule can be created such that the two adjacent downlink and uplink carriers, i.e. downlink carrier X and uplink carrier Y, downlink carrier Z and uplink carrier W, are assigned the same relationship identifiers, respectively. Alternatively, a rule can be created such that the relationship identifier is assigned to the downlink carriers in the arranged order of downlink carrier informations implicitly and the uplink carriers in the arranged order of uplink carrier informations implicitly. In this case, the downlink carrier corresponding to the nth information included in the control message and the uplink carrier corresponding to the nth information included in the control message are assigned the same relationship identifier implicitly.

Of course, the carriers in use currently at the time point when the control message is transmitted, e.g. carrier A 1915 and carrier B 1920 are assigned the relationship identifier. The carrier aggregation is triggered with the addition of a carrier for the UE 1905 which is communicating data on one downlink carrier and one uplink carrier. The carrier which has been used before the start of the carrier aggregation operation is referred to as primary carrier which has to be assigned a relationship identifier too. In the present invention, when the carrier aggregation operation starts for a certain UE 1905, i.e. when a new carrier is added for the UE 1905 which communicates data only on the primary carrier, a predetermined value is applied rather than a relationship identifier of the primary carrier is signaled explicitly. The predetermined value can be 0 as an example. The primary carrier may become a non-primary carrier (a carrier which is not the primary carrier among the carriers aggregated for the UE 1905) through a primary carrier change process afterward. However, once a relationship carrier is assigned implicitly, this is maintained regardless of the change of the primary carrier. That is, although the relationship identifier of a certain carrier is not 0, it is not always true that this carrier is the primary carrier.

Next, the UE 1905 configures the association relationships between the uplink carriers 1920 and 1930 and the downlink carriers 1915 and 1925 using the relationship identifiers of the carriers 1915, 1920, 1925, and 1930 and the separately signaled relationship configuration information at step 1955. The explicit relationship configuration information can be signaled separately or not signaled. If the explicit relationship configuration information is not signaled, all of the association relationships are determined based on the relationship identifier.

Figure 20:
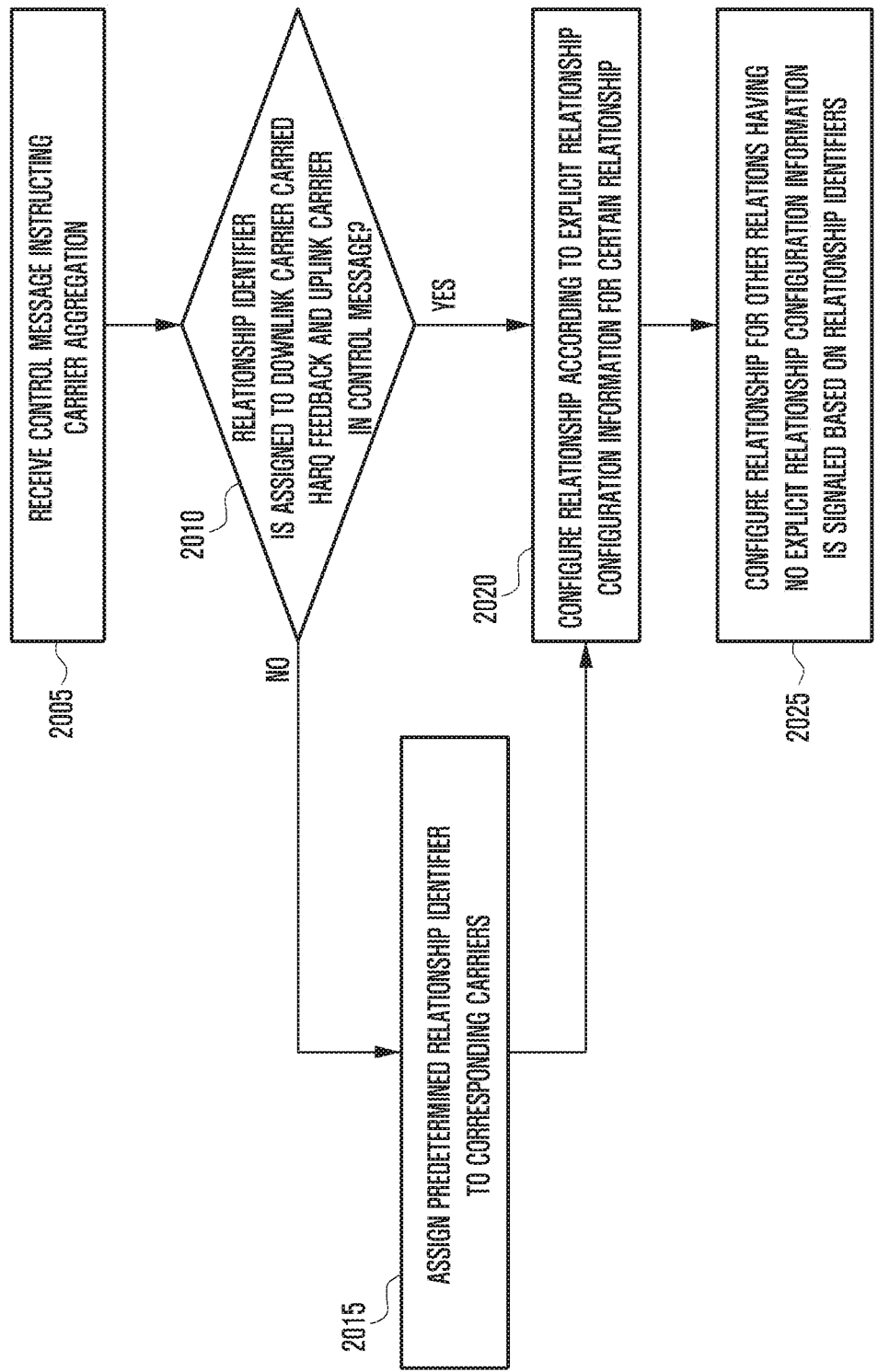
FIG. 20 is a flowchart illustrating the UE operation according to the fifth embodiment of the present invention.

FIG. 20 is a flowchart illustrating the UE operation according to the fifth embodiment of the present invention.

Referring to FIG. 20, if the control message instructing carrier aggregation is received at step 2005, the UE aggregates carriers as instructed in the control message. The UE also checks the relationship identifier assigned to the carriers and explicit relationship configuration information. At this time, the explicit relationship configuration information can be included or not. The UE determines whether the downlink carrier used for transmitting the control message and the uplink carrier to be used for HARQ feedback corresponding to the control message have been assigned the relation identifier at step 2010. Alternatively, the UE determines whether the primary carrier (or the primary cell from the view point that cells, rather than carriers, are aggregated for the UE) has the relationship identifier at the time when the control message is received.

If the carrier aggregation is not initiated before receiving the control message (if only the primary carrier has been configured before the receipt of the control message), this means that the downlink carrier on which the control message has been received at step and the uplink carrier on which the HARQ feedback corresponding to the control message has been transmitted are not assigned the relationship identifier yet, the procedure goes to step 2015. At step 2015, the UE assigns a predetermined relationship identifier to the downlink primary carrier and the uplink primary implicitly. Here, the predetermined relationship identifier can be the lowest index of 0. Next, the procedure goes to step 2020.

Otherwise, if it is determined at step 2010 that the downlink carrier on which the control message has been received and the uplink carrier on which the HARQ feedback has been transmitted, or the downlink primary carrier and the uplink primary carrier, are assigned the relationship identifier, the procedure goes to step 2020.

In the case that the explicit relationship configuration information exists, the UE configured the relationship as instructed explicitly at step 2020. Next, in the case of the other relationships with the exception of the case where the explicit relationship configuration information exist, the UE configures the relationship between the uplink carrier and the downlink carrier having the same relationship identifier.

A description is made of the configuration of the UE apparatus for performing the above-described operations according to the embodiments of the present invention.

Figure 21:
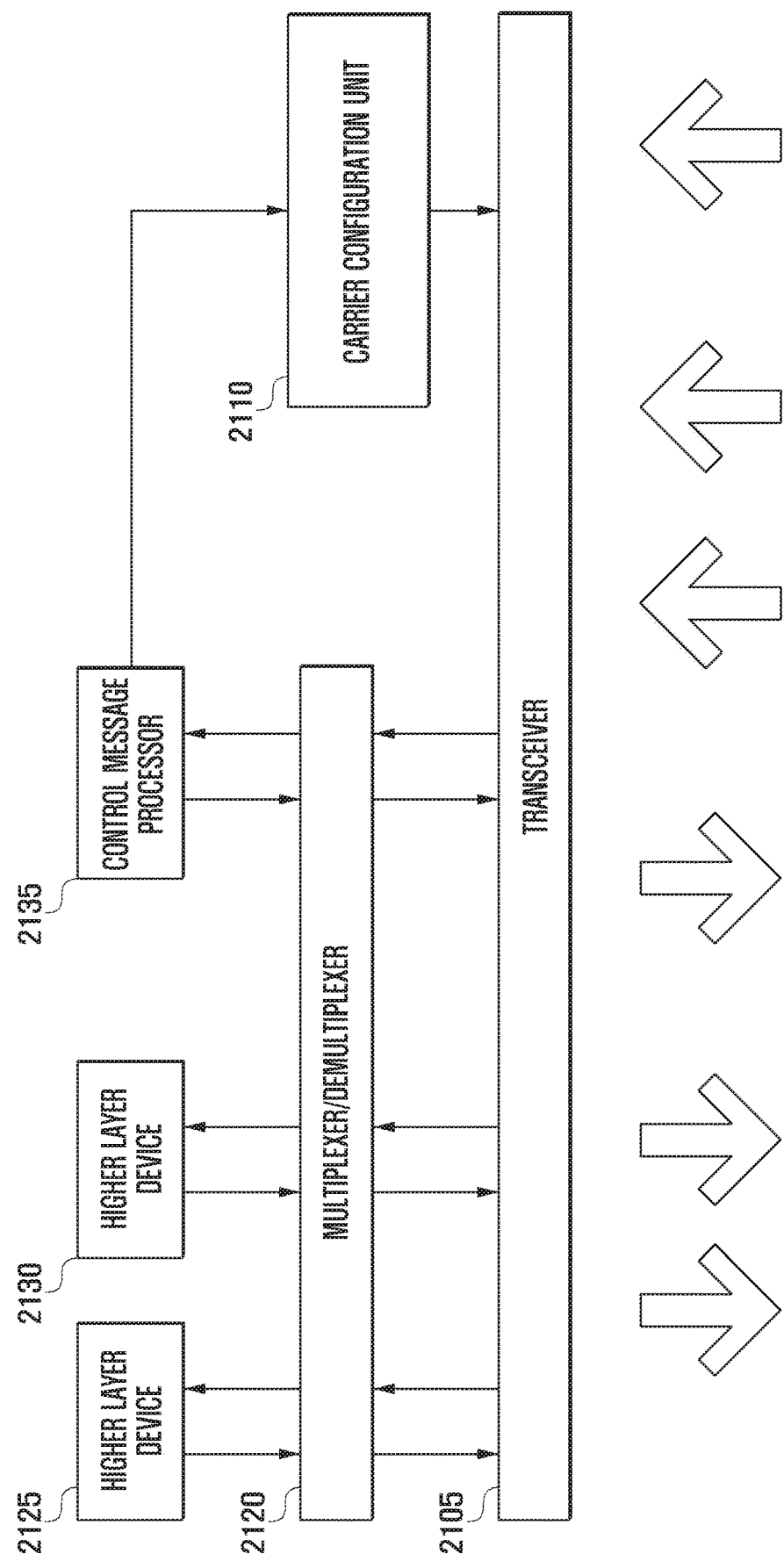
FIG. 21 is a block diagram illustrating a configuration of the UE apparatus according to the fifth embodiment of the present invention.

FIG. 21 is a block diagram illustrating a configuration of the UE apparatus according to the fifth embodiment of the present invention.

Referring to FIG. 21, the UE apparatus includes a transceiver 2105, a carrier configuration unit 2110, a multiplexer/demultiplexer 2120, a control message processor 2135, and various higher layer devices 2125 and 2130.

The transceiver 2105 receives data and predetermined control signals on the downlink carrier and transmits data and control signals on the uplink carrier. In the case that multiple carriers are aggregated, the transceiver transmits and received the data and control signals over the multiple carriers.

The carrier configuration unit 2110 configures the carriers based on the carrier information including the relationship configuration information and relationship identifier received from the control message processor 2135. The carrier configuration unit 2110 also configures the relationship between the uplink and downlink carriers based on the relationship identifier of the configured carriers and the relationship configuration information.

The multiplexer/demultiplexer 2120 multiplexes the data generated by the higher layer devices 2125 and 2130 and/or control message processor 2135 or demultiplexes the data received by the transceiver 2105 and delivers the demultiplexed data to appropriate higher layer devices 2125 and 2130 and/or the control message processor 2135.

The control message processor 2135 processes the control message transmitted by the network and takes an appropriate action. For example, the control message processor 2135 sends the carrier information included in the control message to the carrier configuration unit 2110.

The higher layer device 2125 or 2130 is activated per service to process the data generated by a user service such as FTP or VoIP to the multiplex part of the multiplexer/demultiplexer 2120 or process the data output by the demultiplex part of the multiplexer/demultiplexer 2120 to the service application on the higher layer.

Sixth Embodiment

The sixth embodiment of the present invention proposes a method and apparatus for controlling SRS transmission resource allocation with RRC messages and controlling the SRS transmission and transmission resource release with the activation state of the downlink carrier associated with the uplink carrier.

The uplink carrier and the associated downlink carrier are the uplink and downlink carriers belonging to the same SCell. The SCell is a set of certain secondary downlink carriers (or downlink transmission resource) and the secondary uplink carriers (or uplink transmission resource) configured to have a predetermined relationship with the downlink carrier that is aggregated for the UE. The uplink transmission resource on the uplink carrier of a certain SCell may be allocated only through the downlink carrier of the same SCell. That is, the downlink carrier of a certain SCell can be associated with the uplink carrier of the same SCell in view of scheduling. Alternatively, it can be configured that which downlink and uplink carriers are included in the same SCell using the explicit control information in the carrier configuration procedure. In the present invention, if a downlink carrier of a certain SCell is activated or deactivated through the downlink carrier state control message, the SRS transmission configured on the uplink carrier of the corresponding SCell is enabled or disabled, particularly the downlink carrier of the SCell is deactivated through the control message, and a predetermined condition is fulfilled, the SRS transmission resource allocated on the uplink carrier of the SCell is released.

Figure 22:
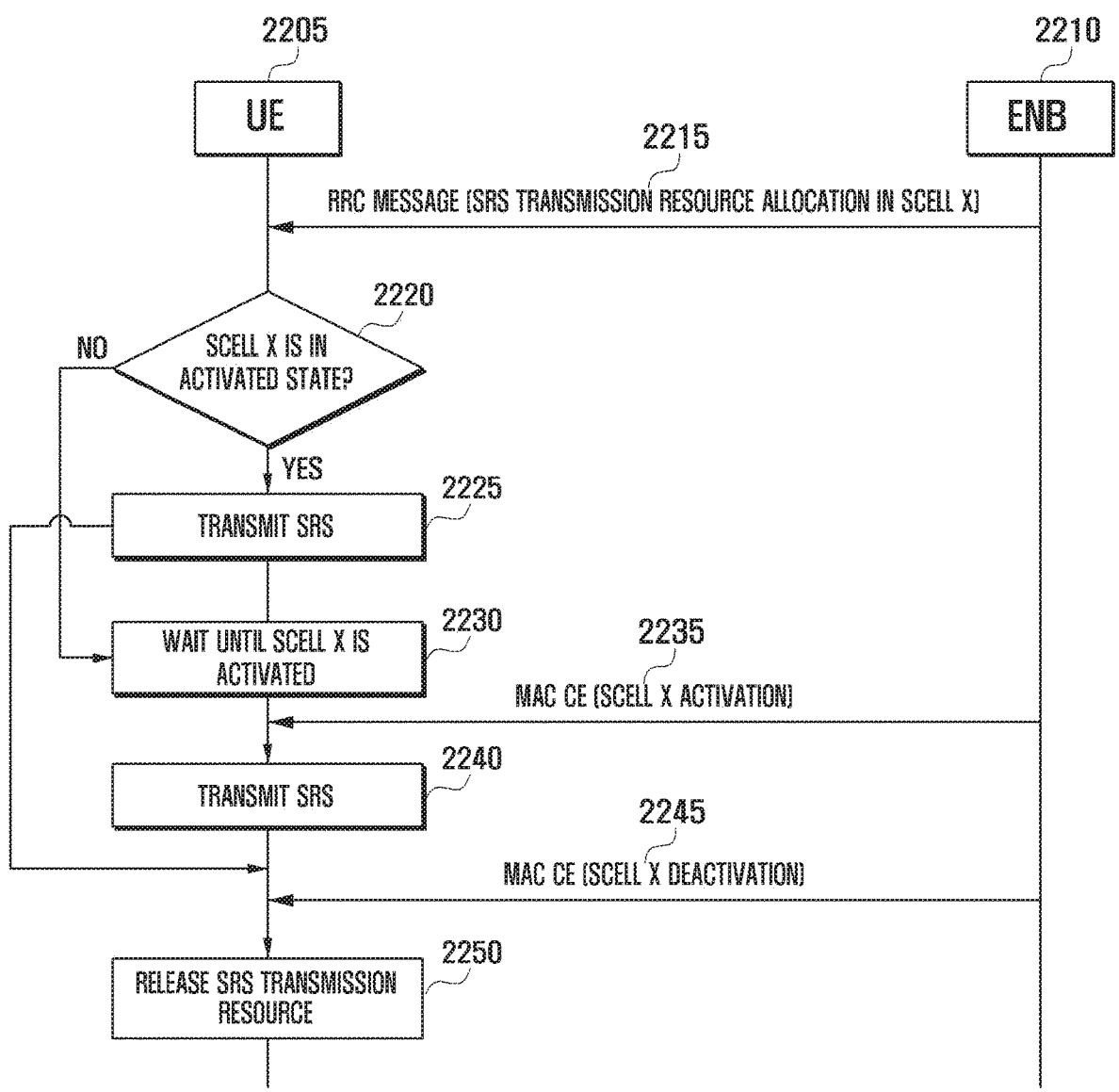
FIG. 22 is a flowchart illustrating the entire operation according to the sixth embodiment of the present invention.

FIG. 22 is a flowchart illustrating the entire operation according to the sixth embodiment of the present invention.

Referring to FIG. 22, the eNB 2210 allocates SRS resource to the UE 2205 in a certain SCell, e.g. SCell x, at step 2215. The transmission resource is allocated by means of an RRC control message.

Next, the UE determines whether the SCell in which the SRS transmission resource is assigned is activated at step 2220. If the SCells is not in the activated state, the procedure goes to step 2230 and, otherwise, step 2225. As described above, if the downlink carrier associated in view of scheduling is in the deactivated state, this means the SRS transmission of the UE 2205 is meaningless such that step 2220 is to enable SRS transmission only when it is meaningful. Since the downlink and uplink carriers belonging to the same SCell are associated in view of scheduling in the most cases with the exception of special cases, if the SCell x is in the deactivated state, this means that the SRS transmission is meaningless and, otherwise if the SCell x is in the activated state, this means that the SRS transmission has be performed. The UE 2205 performs SRS transmission using the allocated SRS transmission resource at step 2225. The SRS transmission is maintained until any event triggering the release of the SRS transmission resource occurs. Meanwhile, the UE 2205 does not perform SRS transmission until the SCell x is activated at step 2230. Although it is typical that the SRS transmission resource for the SCell x is released when the SCell x is in the deactivated state, the UE 2205 maintains, in the above case, the SRS transmission resource since the SCell x is in the deactivated state at the time point whether the SRS transmission resource is allocated.

If the control message for activating the SCell x is received from the eNB 2210 at step 2235, the UE 2205 starts SRS transmission at step 2240. Afterward, if a control message for deactivating the SCell x is received from the eNB 2210 at step 2245, the UE 2205 releases the SRS transmission resource at step 2250. This is because the SRS transmission resource is the limited resource and it is more efficient to release the SRS transmission and assign the released resource to another UE (not shown) rather than to maintain the SRS transmission resource as allocated to a certain terminal 2205 in the deactivated state.

Figure 23:
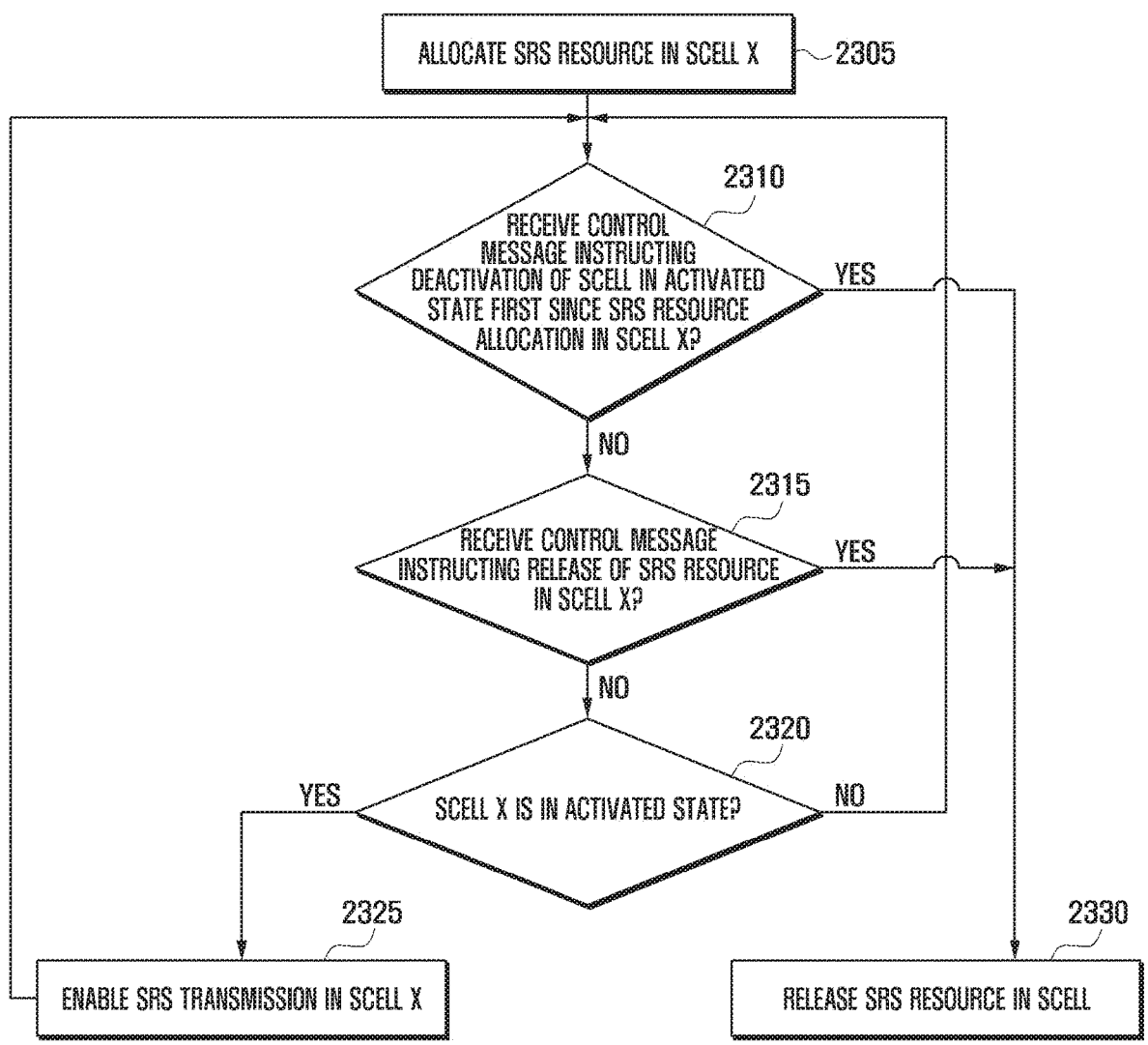
FIG. 23 is a flowchart illustrating the UE operation according to the sixth embodiment of the present invention.

FIG. 23 is directed to the UE operation for determining whether to perform SRS transmission and whether to releases the SRS transmission resource.

Referring to FIG. 23, the SRS resource is allocated in a certain SCell at step 2305. The SRS resource can be allocated using a control message such as RRC CONNECTION RECONFIGURATION message.

Next, if a downlink carrier state control message instructing to deactivate the SCell in the activated state first at step 2310 since the SRS resource allocation, the procedure goes to step 2330 and, otherwise, step 2315. That is, the SCell has been in the activated state already at the time when the SRS resource is allocated and if the downlink carrier state control message for transitioning the state of the SCell to the deactivated state, the procedure goes to step 2330. Also, if the SCell has been in the activated state at the time point when the SRS resource is allocated and, afterward, if the carrier state control message for transitioning the cell state to the activated state and then to the deactivated state back is received first, the procedure goes to step 2330. That is, if the downlink carrier state control message indicating the deactivation state of the SCell is received first in the situation where the SCell is activated, the procedure goes to step 2330 and, otherwise, step 2315. At step 2315, the UE determines whether an RRC control message instructing release of the SRS resource in the S Cell is received. If the RRC control message instructing the release of the SRS resource of the SCell is received, the procedure goes to step 2330 and, otherwise, step 2320. At this time, the order of steps 2310 and 2315 modified. That is, step 2320 can be followed by step 2315.

If the procedure goes to step 2320, this means that the SRS transmission resource allocated to the S Cell x is not released yet and thus the UE determines whether the S Cell x is in the activated state at step 2320. If it is in the activated state, the UE performs SRS transmission in the SCell at step 2325. Next, the UE returns the procedure to step 2310 to determine whether to release the SRS transmission resource. The UE releases the SRS transmission resource at step 2330 and ends the procedure.

Meanwhile, the UE apparatus according to the sixth embodiment of the present invention is identical with the apparatus depicted in FIG. 17 with the exception of the following features. According to this embodiment, the transmission/reception and carrier activation controller checks the activation/deactivation state of a certain SCell to determine whether to enable SRS transmission and whether to release SRS transmission resource in the SCell. According to the determination result, SRS transmission is disabled and the SRS transmission resource is released.

Although exemplary embodiments of the present invention have been described in detail hereinabove with specific terminology, this is for the purpose of describing particular embodiments only and not intended to be limiting of the invention. While particular embodiments of the present invention have been illustrated and described, it would be obvious to those skilled in the art that various other changes and modifications can be made without departing from the spirit and scope of the invention.

What is claimed is:

1. A communication method of a terminal in a communication system, the method comprising:
    receiving, from a base station, a radio resource control (RRC) message including first information on an index for at least one secondary cell (SCell) to be aggregated, second information on a physical cell identity (ID) corresponding to the at least one SCell and third information on a carrier frequency corresponding to the at least one SCell;
    receiving, from the base station, a medium access control (MAC) packet data unit (PDU) including fourth information indicating activation or deactivation for the at least one SCell, wherein the fourth information includes a bitmap, a bit of the bitmap indicating activating or deactivating an SCell of the at least one SCell with an index corresponding to a position of the bit of the bitmap; and
    determining that the at least one SCell is activated or deactivated based on the RRC message and the MAC PDU.

2. The method of claim 1, wherein the activating of the at least one SCell comprises:
    transmitting, to the base station, a sound reference signal (SRS) on an SCell of the at least one SCell that is indicated to be activated based on the fourth information.

3. The method of claim 1,
    wherein the MAC PDU includes a subheader with a predetermined logical channel identifier (LCID) for activation or deactivation of the at least one SCell corresponding to the fourth information, and
    wherein the predetermined LCID for the activation or deactivation of the at least one SCell is set to 11011.

4. The method of claim 1,
    wherein the RRC message is received on a cell with an index set to 0.

5. A communication method of a base station in a communication system, the method comprising:
    transmitting, to a terminal, a radio resource control (RRC) message including first information on an index for at least one secondary cell (SCell) to be aggregated, second information on a physical cell identity (ID) corresponding to the at least one SCell and third information on a carrier frequency corresponding to the at least one SCell;
    transmitting, to the terminal, a medium access control (MAC) packet data unit (PDU) including fourth information indicating activation or deactivation for the at least one SCell, wherein the fourth information includes a bitmap, a bit of the bitmap indicating activating or deactivating an SCell of the at least one SCell with an index corresponding to a position of the bit of the bitmap; and
    activating or deactivating the at least one SCell based on the RRC message and the MAC PDU.

6. The method of claim 5, wherein the activating of the at least one SCell comprises:
receiving, from the terminal, a sound reference signal (SRS) on an SCell of the at least one SCell that is indicated to be activated based on the fourth information.

7. The method of claim 5,
wherein the MAC PDU includes a subheader with a predetermined logical channel identifier (LCID) for activation or deactivation of the at least one SCell corresponding to the fourth information, and
wherein the predetermined LCID for the activation or deactivation of the at least one SCell is set to 11011.

8. The method of claim 5,
wherein the RRC message is transmitted on a cell with an index set to 0.

9. A terminal in a communication system, the terminal comprising:
a transceiver; and
a controller coupled with the transceiver and configured to:
receive, from a base station, a radio resource control (RRC) message including first information on an index for at least one secondary cell (SCell) to be aggregated, second information on a physical cell identity (ID) corresponding to the at least one SCell and third information on a carrier frequency corresponding to the at least one SCell,
receive, from the base station, a medium access control (MAC) packet data unit (PDU) including fourth information indicating activation or deactivation for the at least one SCell, wherein the fourth information includes a bitmap, a bit of the bitmap indicating activating or deactivating an SCell of the at least one SCell with an index corresponding to a position of the bit of the bitmap, and
determine that the at least one SCell is activated or deactivated based on the RRC message and the MAC PDU.

10. The terminal of claim 9, wherein the controller is further configured to transmit, to the base station, a sound reference signal (SRS) on an SCell of the at least one SCell that is indicated to be activated based on the fourth information.

11. The terminal of claim 9,
wherein the MAC PDU includes a subheader with a predetermined logical channel identifier (LCID) for activation or deactivation of the at least one SCell corresponding to the fourth information, and
wherein the predetermined LCID for the activation or deactivation of the at least one SCell is set to 11011.

12. The terminal of claim 9,
wherein the RRC message is received on a cell with an index set to 0.

13. A base station in a communication system, the base station comprising:
a transceiver; and
a controller coupled with the transceiver and configured to:
transmit, to a terminal, a radio resource control (RRC) message including first information on an index for at least one secondary cell (SCell) to be aggregated, second information on a physical cell identity (ID) corresponding to the at least one SCell and third information on a carrier frequency corresponding to the at least one SCell,
transmit, to the terminal, a medium access control (MAC) packet data unit (PDU) including fourth information indicating activation or deactivation for the at least one SCell, wherein the fourth information includes a bitmap, a bit of the bitmap indicating activating or deactivating an SCell of the at least one SCell with an index corresponding to a position of the bit of the bitmap, and
activate or deactivate the at least one SCell based on the RRC message and the MAC PDU.

14. The base station of claim 13, wherein the controller is further configured to receive, from the terminal, a sound reference signal (SRS) on an SCell of the at least one SCell that is indicated to be activated based on the fourth information.

15. The base station of claim 13,
wherein the MAC PDU includes a subheader with a predetermined logical channel identifier (LCID) for activation or deactivation of the at least one SCell corresponding to the fourth information, and
wherein the predetermined LCID for the activation or deactivation of the at least one SCell is set to 11011.

16. The base station of claim 13,
wherein the RRC message is transmitted on a cell with an index set to 0.

* * * * *